US007847968B2

(12) United States Patent
Abiko

(10) Patent No.: US 7,847,968 B2
(45) Date of Patent: Dec. 7, 2010

(54) IMAGE PROCESSING APPARATUS AND METHOD FOR BOOKBINDING PROCESSING

(75) Inventor: Osamu Abiko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1089 days.

(21) Appl. No.: 11/537,741

(22) Filed: Oct. 2, 2006

(65) Prior Publication Data

US 2007/0081180 A1 Apr. 12, 2007

(30) Foreign Application Priority Data

Oct. 7, 2005 (JP) ............................ 2005-295555

(51) Int. Cl.
*G06F 15/00* (2006.01)
*G06K 1/00* (2006.01)
*G06K 15/00* (2006.01)
*G06F 3/12* (2006.01)

(52) U.S. Cl. .................................... 358/1.17; 358/1.13

(58) Field of Classification Search .................. 38/1.17, 38/1.18, 1.13, 1.14, 1.15, 1.1
See application file for complete search history.

(56) References Cited

U.S. PATENT DOCUMENTS 6,857,796 B2 2/2005 Hatayama
7,281,209 B2 * 10/2007 Nara et al. .................. 715/255
2004/0098665 A1 5/2004 Kasahara et al.

FOREIGN PATENT DOCUMENTS

| | | |
|---|---|---|
| JP | 2001-195166 | 7/2001 |
| JP | 2002-361967 | 12/2002 |
| JP | 2003189028 | 7/2003 |
| JP | 2004-155152 | 6/2004 |
| JP | 2005-117238 | 4/2005 |
| JP | 2005-202662 | 7/2005 |

* cited by examiner

*Primary Examiner*—Douglas Q Tran
(74) *Attorney, Agent, or Firm*—Fitzpatrick, Cella, Harper & Scinto

(57) ABSTRACT

It is possible to provide an information processing apparatus capable of appropriately processing a job for case binding without depending on the sequence of page data constituting the job, a method for controlling the apparatus and a program. To accomplish this, a job for case binding is inputted, and the inputted job is stored in storage means of the image processing apparatus. A bookbinding cover attribute is set for page data to be a cover, in the job stored in the storage means. The order of output of page data in the job is determined based on the set attribute. The page data in the job stored in the storage means are read and outputted to a printer unit in accordance with the determined output order.

19 Claims, 28 Drawing Sheets

1800

IMAGE PROCESSING APPARATUS AND METHOD FOR BOOKBINDING PROCESSING

BACKGROUND OF THE INVENTION

1. Field of the Invention

The present invention relates to an image processing apparatus for processing a Job for case binding, and a method for controlling the apparatus.

2. Description of the Related Art

In the commercial printing industry, by receiving an order requesting creation of a printed matter (such as a magazine, newspaper, catalogue, advertisement and gravure) from a third person (a customer or a client), creating the printed matter desired by the client and delivering it to the client, consideration is obtained from the client. In this commercial printing industry, large-scale printing apparatus, such as an offset plate printing machine, has generally been used.

In the commercial printing industry, works are carried out through various processes. The processes include, for example, job entry, designing and layout, comprehensive layout (presentation by output with a printer), proof reading (layout modification or color modification), proof printing, camera-ready copy creation, printing, post-processing, shipment and the like. The camera-ready copy creation requires a printing machine as described above. Once a camera-ready copy is created, it is not easy to modify it, which is considerably disadvantageous from a viewpoint of cost. This is because careful proof reading, that is, layout checking or color confirmation works, are required.

Thus, a large-scale apparatus is required in the industry of this kind, and a certain amount of time is required to create a printed matter desired by a client. Furthermore, each of these works requires expertise, knowledge and know-how from a skilled worker.

Meanwhile, with increases in the speed and improvement in the quality of electrophotographic printing apparatuses or ink-jet printing apparatuses, a business category called print on demand (POD) appears as a competitor to the printing industry as described above.

POD aims at handling printing processing within a short delivery period without using a large-scale apparatus or system by dividing a job to be handled by a printing apparatus into relatively small jobs. In particular, digital printing using electronic data is realized by taking full advantage of digital image forming apparatus such as digital copying machines and a digital complex machine instead of the large-scale printing machine or printing approach as described above. A POD market is being developed. In this POD market, digitalization has been promoted in comparison with the conventional printing industry, and management and control with the use of a computer is spreading. Thereby, the level is coming close to the level of the printing industry.

With this background, there has been developed a print for pay (PFP) printing service by a copy/print shop or a printing company centralized reproduction department (CRD).

At a POD printing site, an image forming apparatus such as a printer and a copying machine, an image input apparatus such as a scanner, and equipment such as post-processing apparatuses for performing processings, such as binding, stapling, cover attaching, gluing, punching and case binding, are connected with one another via a network. Print processing for a print job generated on a client computer connected to the network or a print job inputted via the Internet is performed with the use of the equipment.

At such a printing site, in most cases, one or more workers (operators) are arranged to manage devices and print job processes. For example, they carry outputted sheets to an offline finisher to perform stapling, collation and the like individually for them, or they use a so-called inline finisher connected to the image forming apparatus to perform post-processing works and the like.

There are various kinds of post-processings as stated before. For example, case binding processing will be simply described here.

Case binding is a type of bookbinding (finishing) wherein a body portion, constituted by sheets which are commonly printed on both sides, is covered with one sheet, which is to be a cover, and bound, as shown in FIGS. 1A to 1C. FIG. 1A shows an example of a cover. Commonly, a cover which is a little larger than twice the sheet size of the body portion is used. In the example of FIG. 1A, images are printed on the backside of the cover, and each image is to be shown on the inside of the cover when the book is opened. In the example of FIG. 1A, the cover is formed with one sheet, with a portion to be a back strip included therein. In this case, it is useless to place an image on the back strip portion because glue binding or the like is performed in bookbinding. It is often desired that no image is placed there for the purpose of increasing the effect of glue binding.

FIG. 1B shows the body portion to be covered with the cover. Each sheet of the body portion is commonly printed on both sides, but single-side printing or N-UP printing is also possible. There may be a case where not simple both-side printing but so-called booklet printing is performed. In this case, after the body portion is divided into thin booklets, all the booklets may be glue-bound together with the cover.

FIG. 1C shows an example of the cover in FIG. 1A and the body in FIG. 1B which have just been glue-bound with each other. In this example, a relatively large sheet size is used for the cover. As shown in this example, commonly, a relatively large cover is created, and three edges of the cover are cut later with the use of a finisher such as an offline finisher. In this example, a cut edge A, a cut edge B and a cut edge C are cut and adjusted.

In order to appropriately perform the post-processing as described above, for example, techniques such as a device communication technique for recognizing what kind of post-processing apparatus is connected and a data control technique for storing image data and enabling the data to be read from a specified data are also involved.

As a technique related to such post-processing, Japanese Patent Application Laid-Open No. 2001-195166 discloses a technique for generating, on the PC side, data for a cover in advance separately from a body, and continuously inputting the data for a cover and the data for a body into a printer. In this case, the order of inputting the data for a cover and the data for a body is set for the printer in advance. Therefore, a user who inputs a document has to recognize the position of the cover in the document to be inputted into the system in advance before generating data.

In Japanese Patent Application Laid-Open No. 2004-155152, description is made on how a printed case-binding cover is aligned with a body and folded. However, Japanese Patent Application Laid-Open No. 2004-155152 has a problem that a mechanism for automatically distinguishing a cover and a body from each other is not provided, and a user has to manually distinguish a cover and a body from each other, which is a great burden on the user.

As described above, in the example of the current situation, there is a problem that, in the case of processing data for case binding, for example, appropriate processing may not be performed, and an error is caused, or an operator has to re-edit inputted image data.

The problem will be described with reference to FIGS. 2A to 2B. FIG. 2A is a diagram schematically showing the sequence of page data to be case bound. In FIG. 2A, the first page is a cover portion to be the outermost page. The second page is a portion to be placed on the inside of the cover (inside the book). The third and subsequent pages are data of a body portion to be placed in the book.

In the case of a system capable of controlling printing of a cover and a body at the same time, among common case binding machines, the order of the sequence of pages to be printed and bound is determined in advance. Input of data fixed in advance is expected, for example, "the first page is to be created with data of a cover", "the second page is to be created with data of the inside of the cover", and "the third and subsequent pages are to be created with data of a body". It is also necessary to set this same order for a case binding machine and the entire image processing system. Therefore, it is important to strictly set a rule, such as "the first page is to be created with data of a cover, the second page is to be created with the backside of the cover; and the third and subsequent pages are to be created with a body", in advance.

However, in the case of a print shop and the like, it may be impossible to have a discussion with a customer in advance. Furthermore, a user can carry a sequence of image data into a print shop as a part of provided services, and therefore, it may be unknown in what sequence the image data created by the user are arranged. In such a case, it is conceivable that the sequence does not meet the expectation of an image system which controls case binding.

For example, FIG. 2B shows examples of the conceivable order for different data sequences.

In Type 1, "the first page is to be created with data of a cover; the second page is to be created with data of the inside/backside of the cover; and the third and subsequent pages are to be created with data of a body".

In Type 2, "the last page is to be created with data of the backside of a cover; the page before the last page is to be created with data of the cover; and the first page to the third page from the last page are to be created with data of a body".

In Type 3, "the first page is to be created with data of the front side of a front cover; the second page is to be created with data of the backside of the front cover; the last page is to be created with data of a back strip; the second page from the last page is to be created with data of the front side of a back cover; and the third page from the last page is to be created with data of the backside of the back cover".

Type 4 shows the case where pages for a cover and a body are stored in different files.

As described above, various patterns are conceivable as the page sequence for case binding to be set by the user. Therefore, if data for case binding is inputted without recognition of the configuration and expectation of equipment on the accepting side, there may be caused a problem that desired processing cannot be accomplished, and an error, a request for modification of the sequence of pages or the like is caused. The types shown in FIG. 2B are only examples. Naturally, more page sequence patterns exist, and it is desired to adaptively correspond to each of them.

SUMMARY OF THE INVENTION

The present invention has been made to solve the above problem, and its object is to provide an information processing apparatus capable of appropriately processing a job for case binding without depending on the sequence of page data constituting the job, and a method for controlling the apparatus.

According to the present invention, the foregoing object is attained by providing an image processing apparatus for processing a job for case binding, comprising:

input means for inputting a job including page data constituted by a bookbinding cover and body pages for the case binding;

storage means for storing the job inputted by the input means;

setting means for setting a bookbinding cover attribute for page data to be a cover in the job stored in the storage means;

decision means for deciding the order of output of page data in the job based on the attribute set by the setting means; and output means for reading the page data in the job stored in the storage means and outputting the page data to a printer unit in accordance with the order of output decided by the decision means.

In a preferred embodiment, the setting means comprises:

first setting means for inputting a determination condition for automatically setting a bookbinding cover attribute for page data in the job, and automatically setting a bookbinding cover attribute for particular page data in the job in accordance with the inputted determination condition;

second setting means for manually setting a bookbinding cover attribute for page data in the job in accordance with an operation by an operator; and selection means for selecting any of a first mode for executing the setting by the first setting means and a second mode for executing the setting by the second setting means.

In a preferred embodiment, the apparatus further comprises template storage means for storing templates configured by a pattern of a sequence of page data for which attributes are set in advance; wherein the first setting means is capable of selecting a desired template from among the templates stored in the template storage means as a condition for setting attributes for the page data in the job.

In a preferred embodiment, the first setting means comprises:

determination means for determining, when multiple kinds of conditions are inputted, whether or not the combination of the conditions is appropriate; and error message output means for outputting an error message based on the result of the determination by the determination means.

In a preferred embodiment, the apparatus further comprises message output means for, when an error occurs during output by the output means while the first mode being selected, outputting a message to prompt transition to the second mode.

In a preferred embodiment, the second setting means comprises:

display means for displaying an image corresponding to page data in the job;

attribute setting means for setting attributes for the page data in the job with the use of the image displayed by the display means; and registration means for registering a pattern of a sequence of the page data for which the attributes have been set by the attribute setting means with the template storage means as a template.

In a preferred embodiment, the second setting means comprises import means for importing the template generated by an external application into the template storage means.

In a preferred embodiment, the attributes include at least one of "front side of case binding cover", "backside of case binding cover", "back strip of case binding cover" and "body other than case binding cover", and the attributes are set for the page data or page areas thereof.

In a preferred embodiment, the setting means sets the attributes for the page data in the job inputted by the input means based on operations performed on a setting screen displayed on a display unit provided for the image processing apparatus.

In a preferred embodiment, the storage means is a predetermined data storage area managed by an external apparatus connected to the image processing apparatus.

According to the present invention, the foregoing object is attained by providing a method for controlling an image processing apparatus for processing a job including page data constituted by a bookbinding cover and body pages for the case binding, the method comprising:

an input step of inputting a job for case binding;

a storage step of storing the job inputted in the input step in storage means of the image processing apparatus;

a setting step of setting a bookbinding cover attribute for page data to be a cover in the job stored in the storage means in the storage step;

a decision step of deciding the order of output of page data in the job based on the attribute set in the setting step; and an output step of reading the page data in the job stored in the storage means and outputting the page data to a printer unit in accordance with the order of output decided in the decision step.

According to the present invention, the foregoing object is attained by providing a program stored in a computer-readable medium, for causing control of an image processing apparatus for processing a job including page data constituted by a bookbinding cover and body pages for the case binding to be executed, the program when loaded into a computer and executed causing the information processing apparatus to execute the following steps:

an input step of inputting a job for the case binding;

a storage step of storing the job inputted in the input step in storage means of the image processing apparatus;

a setting step of setting a bookbinding cover attribute for page data to be a cover in the job stored in the storage means in the storage step;

a decision step of deciding order of output of page data in the job based on the attribute set in the setting step; and an output step of reading the page data in the job stored in the storage means and outputting the page data to a printer unit in accordance with the order of output decided in the decision step.

Further features of the present invention will be apparent from the following description of exemplary embodiments with reference to the attached drawings.

DESCRIPTION OF THE EMBODIMENTS

Preferred embodiment of the present invention will now be described, by way of example only, with reference to the drawings.

It should be noted that the relative arrangement of the components, the numerical expressions and numerical values set forth in these embodiments do not limit the scope of the present invention unless it is specifically stated otherwise.

The outline of the entire system will be described first.

Figure 3:
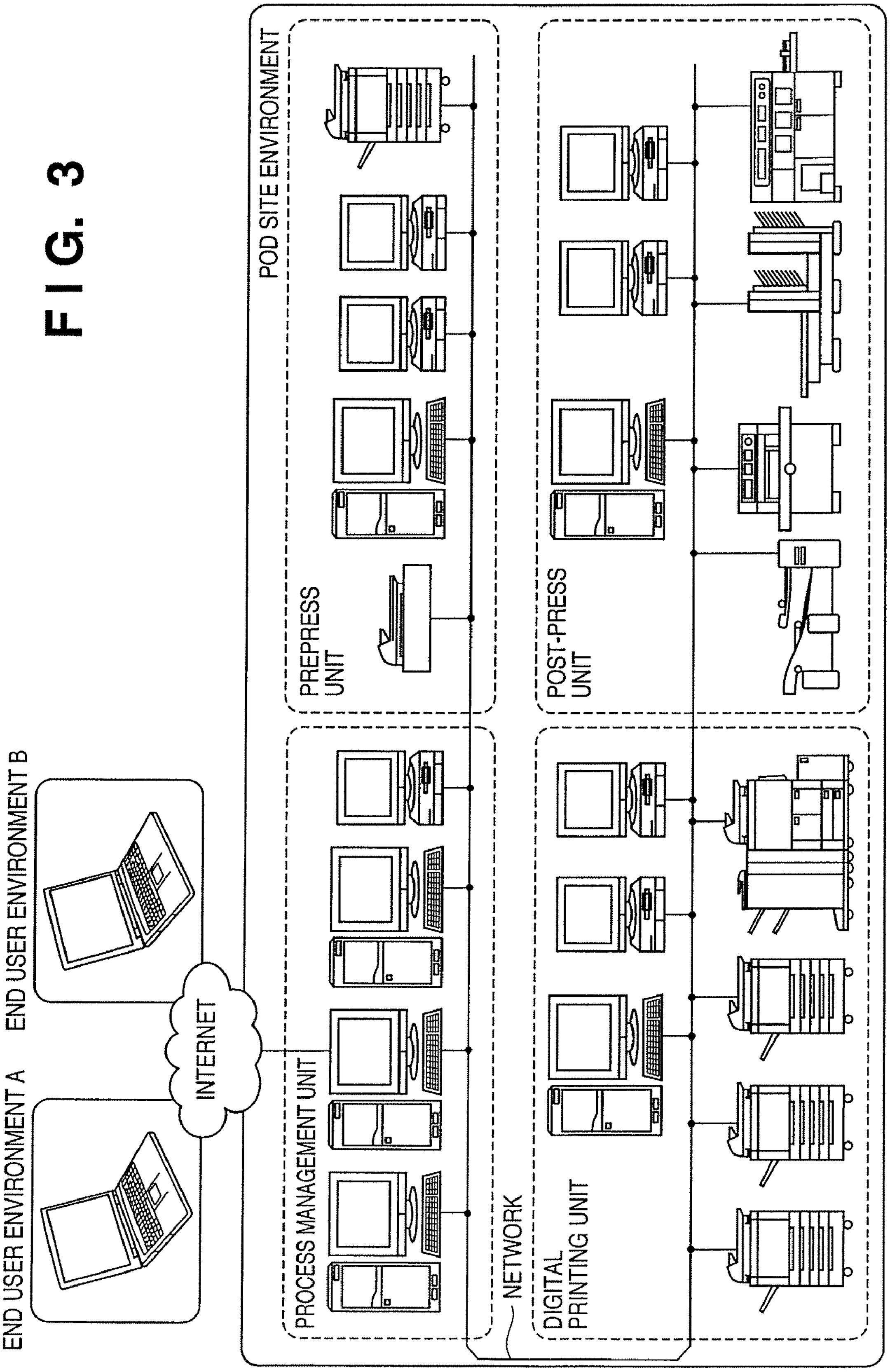
FIG. 3 is a block diagram showing an example of the basic configuration of the entire system of an embodiment 1 of the present invention.

FIG. 3 is a block diagram showing an example of the basic configuration of the entire system of an embodiment 1 of the present invention.

This block diagram is configured by one or more end user environments and a POD (print on demand) site environment connected via a network such as the Internet. In the end user environment, there exists an orderer who orders and requests printing. From each of the end user environments (here, end user environments A and B), requests for performing a print job, requests for confirmation of job status and the like can be performed with the use of each client PC.

In the present embodiment, the POD site environment is constituted by four processes: namely, a process management unit, a prepress unit, a digital printing unit, and a post-press unit.

The process management unit is a portion for giving work instructions to each of the processes of the process management unit, the preprocess unit, the digital printing unit and the post-press unit in the POD site environment and consolidating the workflow of this system, which is configured by computers and various devices. This process management unit receives a job from an end user or stores a job from the end user. Furthermore, the process management unit creates a workflow with the works in the respective processes, efficiently scheduling the work of each device and/or each worker, based on specifications for a job by the end user.

The prepress unit scans a paper document received from the end user with a scan device such as a scanner or MFP (multi-function peripheral), based on a prepress job work instruction received from the process management unit. The prepress unit also stores an image obtained by the scanning in a prepress server or a client PC as a scanned image file. In addition, the prepress unit executes various processes such as image correction, file merging and page insertion/deletion, layout/editing for various pages and imposition processing. The prepress unit also outputs a proof for confirming the layout or tone of the final product, as necessary.

The digital printing unit copies a paper document received from the end user using a scanning/printing device in accordance with a print job work instruction received from the process management unit or the prepress unit. In addition, it prints out a received file to a printing device from a client PC via a printer driver or a hot folder, and the like. The received file can comprise a document/image file received from the end user, a san image file obtained from a scanning device, a document/image file obtained by editing the files and the like. The scanning/printing device can comprise a black-and-white MFP, a color MFP and the like.

The post-press unit controls post-processing devices such as a folding machine, a saddle stitching machine, a case binding machine, a cutting machine, an enclosing machine and a collating machine in accordance with a post-press job work instruction received from the process management unit, the prepress unit or the digital printing unit. In addition, the post-press unit executes finishing processes such as folding, saddle stitching, case binding, cutting, enclosing and collating for recording paper outputted from the digital printing unit, and the like.

Next, the configuration of an MFP, which is an image processing apparatus to be used in the POD site environment, will be described with reference to FIG. 4A.

Figure 4A:
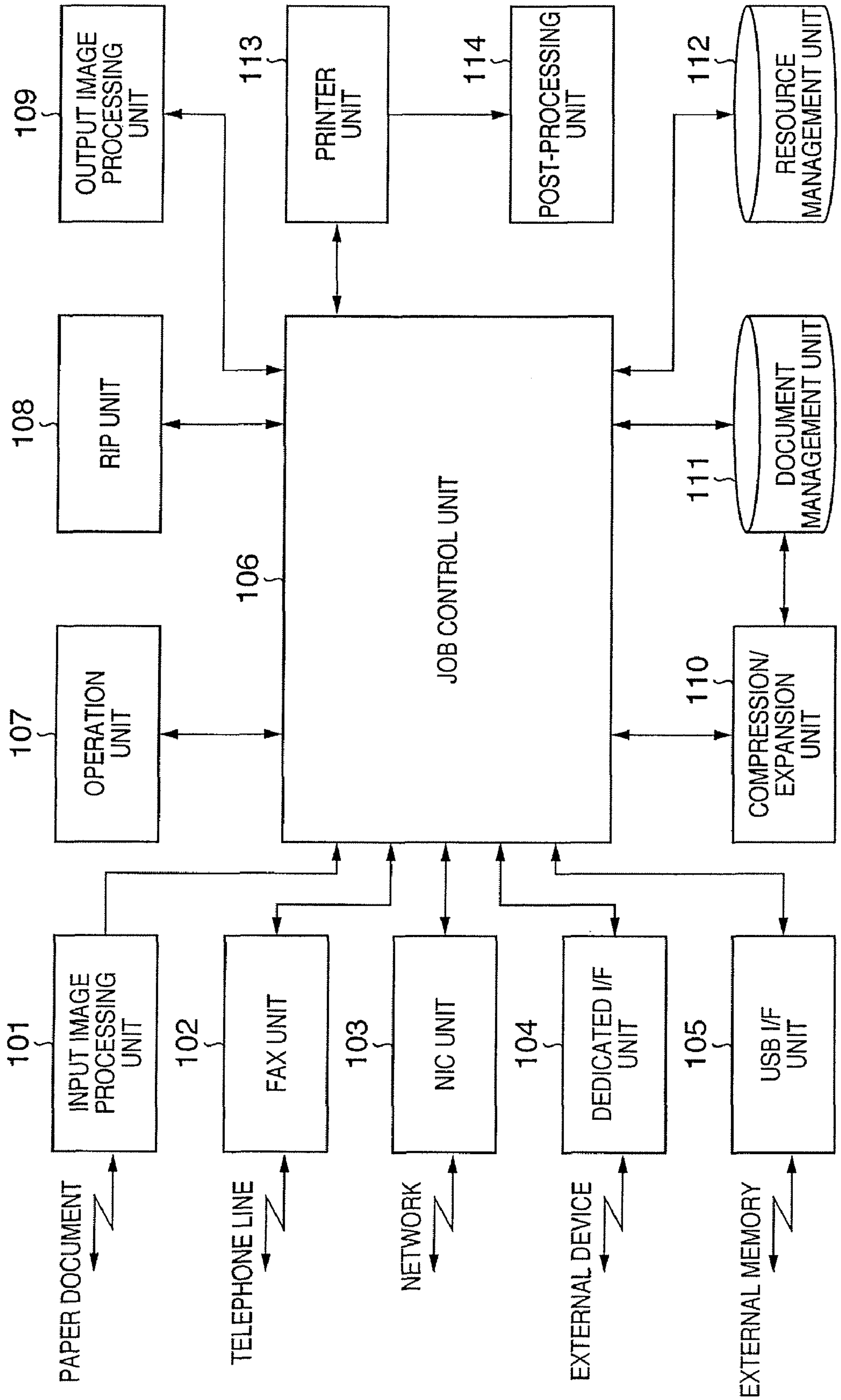
FIG. 4A is a diagram showing the configuration of an MFP of the embodiment 1 of the present invention.

FIG. 4A is a diagram showing the configuration of an MFP of the embodiment 1 of the present invention.

The MFP is provided with a storage device such as a hard disk capable of storing data for multiple jobs (job data) inside it. An MFP 104 is an image processing apparatus provided with multiple functions. As an example of the functions, it may be provided with a copy function which enables job data outputted from a scanner to be printed by a printer unit via the storage device. It is also provided with a printing function which enables job data outputted from an external apparatus such as a PC to be printed by a printer unit via the storage device.

There are full-color and monochrome MFPs. In most cases, the full-color MFP includes the configuration of the monochrome MFP with respect to basic functions, except for a color processing function, internal data and the like. Therefore, description will be focused on a full-color MFP here, and description of the monochrome MFP will be added as necessary.

This system may be configured to be provided with a multi-function-type image forming apparatus provided with multiple functions and an SFP, which is a single-function-type image forming apparatus provided with only the printing function. Alternatively, it may be configured to be provided only with an image forming apparatus of any type. Furthermore, for any or both of the types, multiple image forming apparatuses may be provided.

The SFP is an abbreviation of a single function peripheral, that is, peripheral equipment provided with a single function.

As shown in FIG. 4A, the MFP is provided with an input image processing unit 101 for reading an image on a paper document or the like and performing image processing of the read image data, and a FAX unit 102 for performing sending/receiving of an image via a telephone line represented by facsimile. It is also provided with an NIC (network interface card) unit 103 for performing sending/receiving of image data or apparatus information with an external apparatus such as a PC with the use of a network.

The MFP is also provided with a dedicated interface (I/F) unit 104 for exchanging information such as image data with an external apparatus. It is also provided with a USB interface (USB I/F) unit 105 for performing sending/receiving of data such as image data with USB (Universal Serial Bus) equipment represented by a USB memory (a kind of removable medium).

The input image processing unit 101 is realized, for example, by a scanner having an ADF (automatic document feeder).

A job control unit 106 controls various processes such as temporarily storing image data depending on the purpose of the MFP, determining a data transfer route, and the like.

A document management unit Ill is realized by a storage device such as a hard disk in which multiple image data can be stored. For example, a control unit (for example, the CPU, the memory (RAM or ROM) and the like of the job control unit 106) provided for the image forming apparatus controls multiple kinds of image data to be stored in the document management unit 111.

The multiple kinds of image data include image data from the input image processing unit 101. Image data of a facsimile job inputted via the FAX unit 102 is also included. Image data inputted from an external apparatus via the NIC unit 103, the I/F unit 104 or the USB I/F unit 105 is also included.

The job control unit 106 reads image data stored in the document management unit 111 as appropriate, transfers it to the output unit of a printer unit 113 and controls output processing such as printing processing by the printer unit 113. The job control unit 106 also controls the image data read from the document management unit 111 in response to an instruction by an operator to be transferred or distributedly transferred to at least one external apparatus such as a PC or another image forming apparatus via the network.

When image data is stored in the document management unit 111, processing such as compressing and storing the image data is performed, and reversely, when the image data compressed and stored is read, processing such as expanding and returning the data to the original data is performed, via an compression/expansion unit 110 as necessary. It is generally known that, in order to cause data to pass through the network, compressed data such as JPEG, JBIG and ZIP data can be used. After the data is inputted into the MFP, such compressed data is decompressed (expanded) by this compression/expansion unit 110.

In a resource management unit 112, there is stored data of various parameter tables, such as font, color profile and gamma tables, to be used by various image processes. Such data can be invoked as necessary, and it is possible to store a new parameter table, or correct and update the parameter tables.

When PDL data is inputted into the job control unit 106, RIP processing is performed by an RIP unit 108, or image processing for printing is performed by an output image processing unit 109 for the image to be printed as necessary. It is also possible to store intermediate data or print ready data (bit map data for printing or data obtained by compressing it) of the image data, which is generated then, in the document management unit 111 again as necessary.

PDL is an abbreviation of Page Description Language. RIP is an abbreviation of a raster image processor.

The image data for which various processes have been performed is sent to the printer unit 113 which performs image forming. Sheets on which printing has been performed by the printer unit 113 are sent to a post-processing unit 114, where sorting processing and finishing processing of the printing sheets are performed.

The job control unit 106 is responsible for causing a job to smoothly flow and controls switching of processing routes among components within the MFP to execute the various functions A) to N) below in accordance with the content of an operation to the MFP.

It is generally known that image data is stored as intermediate data as necessary. However, accesses other than accesses with the document management unit 111 as a start point or an end point will not be described here. Processes to be performed by the compression/expansion unit 110 and the post-processing unit 114, which may be used as necessary, and processing to be performed by the job control unit 106, are omitted so that an outline flow can be understood.

A) Copy function: input image processing unit 101→output image processing unit 109→printer unit 113

B) Facsimile function: input image processing unit 101→FAX unit 102

C) Facsimile receiving function: FAX unit 102→output image processing unit 109→printer unit 113

D) Network scanning: input image processing unit 101→NIC unit 103

E) Network printing: NIC unit 103→RIP unit 108→output image processing unit 109→printer unit 113

F) Scanning of external apparatus: input image processing unit 101→dedicated I/F unit 104

G) Printing from external apparatus: I/F unit 104→RIP unit 108→output image processing unit 109→printer unit 113

H) Scanning of external memory: input image processing unit 101→USB I/F unit 105

I) Printing from external memory: USB I/F unit 105→RIP unit 108→output image processing unit 109→printer unit 113

J) Box scanning function: input image processing unit 101→output image processing unit 109→document management unit 111

K) Box printing function: document management unit 111→printer unit 113

L) Box receiving function: NIC unit 103→RIP unit 108→output image processing unit 109→document management unit 111

M) Box sending function: document management unit 111→NIC unit 103

N) Preview function: document management unit 111→an operation unit 107

Though combinations with various functions including an E-mail service and a Web server function are conceivable in addition to those described above, description thereof is omitted here.

Among the above functions A) to N), J) box scanning function, K) box printing function, L) box receiving function and M) box sending function are MFP processing functions involving writing or reading of data with the use of the document management unit 111. These processing functions are functions for dividing a storage area in the document management unit 111 for respective jobs or respective users to temporarily store data and performing input/output of the data by combining a user ID and a password.

The operation unit 107 is for making selection from among the various flows or functions described above or instructing operation of any of them. With higher resolution of the display device of the operation unit 107, it is possible to realize processes such as previewing image data stored in the document management unit 111 and then performing printing if it is desired after confirmation.

Next, the functional configuration of the image processing apparatus (MFP) will be described with reference to FIG. 4B.

Figure 4B:
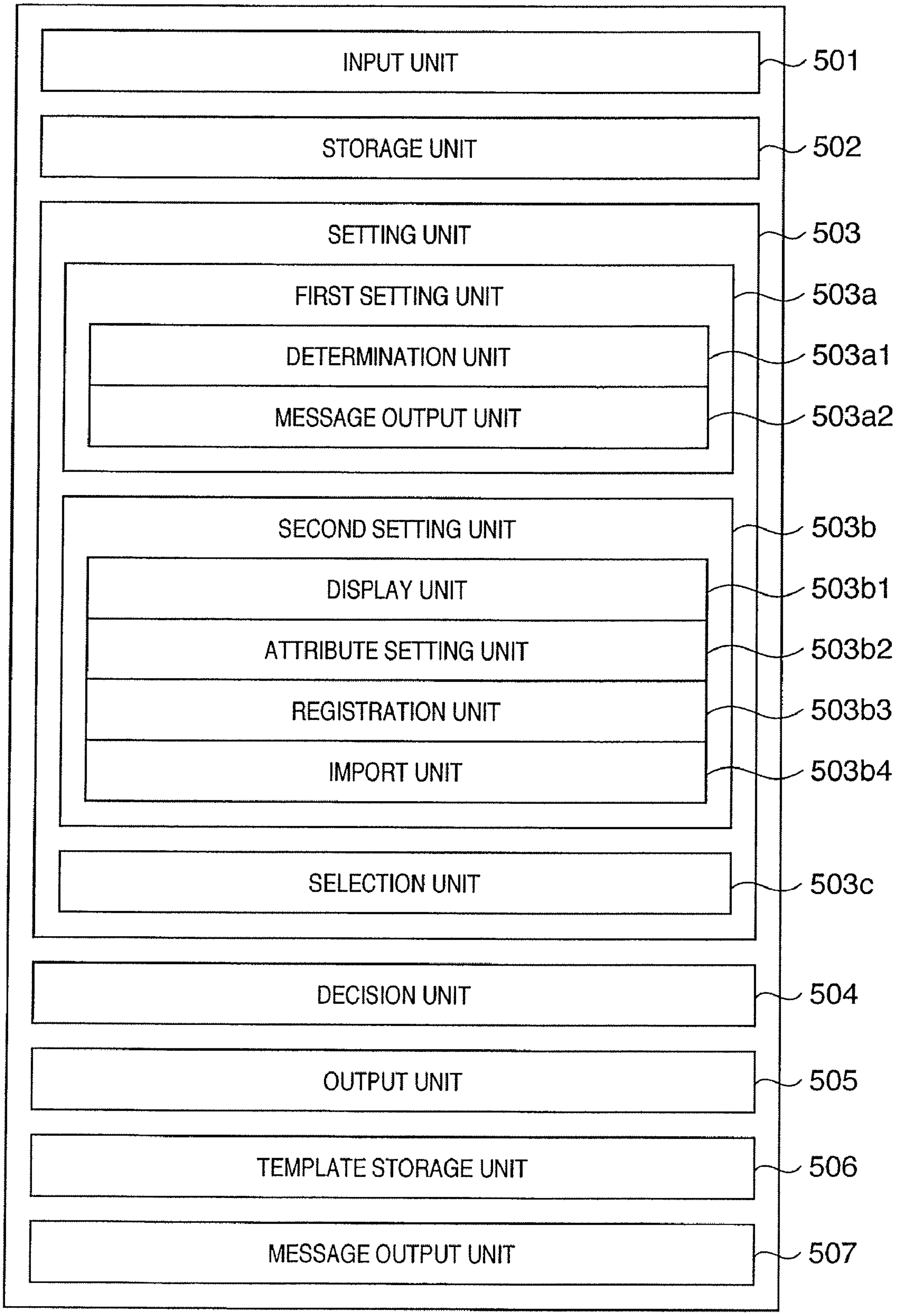
FIG. 4B is a diagram showing the functional configuration of an image processing apparatus of the embodiment 1 of the present invention.

FIG. 4B is a block diagram showing the functional configuration of an image processing apparatus of the embodiment 1 of the present invention.

An input unit 501, a storage unit 502, a setting unit 503, a decision unit 504, an output unit 505, a template storage unit 506 and a message output unit 507 are realized by various programs executed by the job control unit 106 (FIG. 4A).

The input unit 501 inputs a job including page data constituted by a bookbinding cover for case binding and body pages. The storage unit 502 stores the inputted job. The setting unit 503 sets a bookbinding cover attribute for page data in the job stored in the storage unit 502 which is to be the cover. The decision unit 504 decides the order of output of the page data in the job. The output unit 505 reads the page data in the job stored in the storage unit 502 and outputs the page data to the printer unit in accordance with the determined output order.

The setting unit 503 is provided with a first setting unit 503*a*, a second setting unit 503*b* and a selection unit 503*c*. The first setting unit 503*a* inputs a determination condition for automatically setting a bookbinding cover attribute for page data in a job and automatically sets the bookbinding cover attribute for particular page data in the job in accordance with the inputted determination condition. The second setting unit 503*b* is for manually setting the bookbinding cover attribute for page data in a job in accordance with an operation by an operator. The selection unit 503*c* selects any of a first mode for executing the settings made by the first setting unit 503*a* and a second mode for executing the settings made by the second setting unit 503*b*.

The template storage unit 506 stores a template formed by a pattern of a sequence of page data for which attributes are set in advance.

The first setting unit 503*a* can select a desired template from among templates stored in the output unit 505 as a condition for setting attributes for page data in a job.

The first setting unit 503*a* is provided with a determination unit 503*a*1 and a message output unit 503*a*2. When multiple kinds of conditions are inputted, the determination unit **503*a*1 determines whether or not the combination of the conditions is appropriate. The message output unit 503*a*2** may output an error message based on the determination result.

If an error occurs during output by the output unit 505 when the first mode is selected, then the message output unit 507 outputs a message prompting transition to the second mode.

The second setting unit **503*b* is provided with a display unit 503*b*1, an attribute setting unit 503*b*2, a registration unit 503*b*3 and an import unit 503*b*4**.

The display unit **503*b*1 displays an image corresponding to page data in a job. The attribute setting unit 503*b*2 sets attributes for page data in a job with the use of an image displayed by the display unit 503*b*1. The registration unit 503*b*3 registers a pattern of a sequence of page data for which attributes are set in the storage unit as a template. The import unit 503*b*4** imports a template generated by an external application into the storage unit.

Next, an example of the operation unit 107 will be described with reference to FIG. 5.

Figure 5:
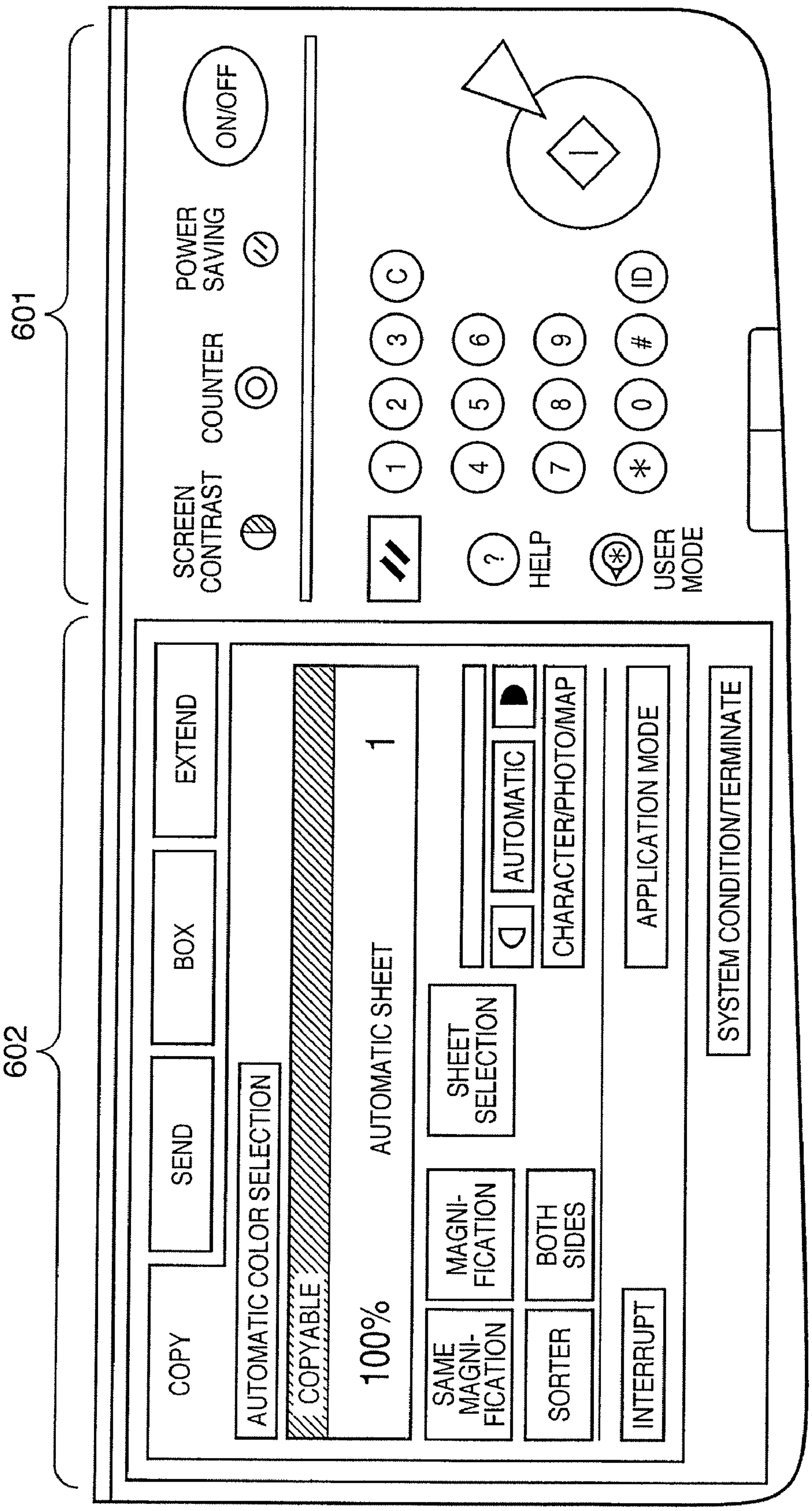
FIG. 5 is a diagram showing an example of an operation unit of the embodiment 1 of the present invention.

FIG. 5 is a diagram showing an example of an operation unit of the embodiment 1 of the present invention.

The operation unit 107 is a user interface with an operator, and it is configured mainly by two interfaces (a key input unit 601 and a touch panel unit 602).

The touch panel unit 602 is a panel-type interface which displays character strings or buttons in response to an instruction from the CPU inside the image processing system which is responsible for controlling the operation unit. The touch panel unit 602 displays information to an operator and inputs information from the operator. It is possible to display particular buttons, character strings or the like on the touch panel unit 602, and it is also possible to recognize information about the displayed area. Therefore, for example, if the operator selects a button, which button has been selected is recognized, and appropriate processing is performed by the job control unit 106 according to the button.

The key input unit 601 is an interface configured by hard keys. This key input unit 601 originally exists as hard key elements such as buttons and a dial unlike the touch panel unit 602 which is configured to variably display character strings. For each of these hard key elements, processing to be performed when it is operated is specified in advance. Alternatively, it is possible for a user to allocate a processing method to the key. Of course, linked operations, such as inputting a numeric into and displaying a numeric on the interface on the touch panel unit 602 in response to the hard key element, are possible.

Next, description will be made on an example of an operation screen to be displayed on the touch panel unit 602, with reference to FIG. 6.

Figure 6:
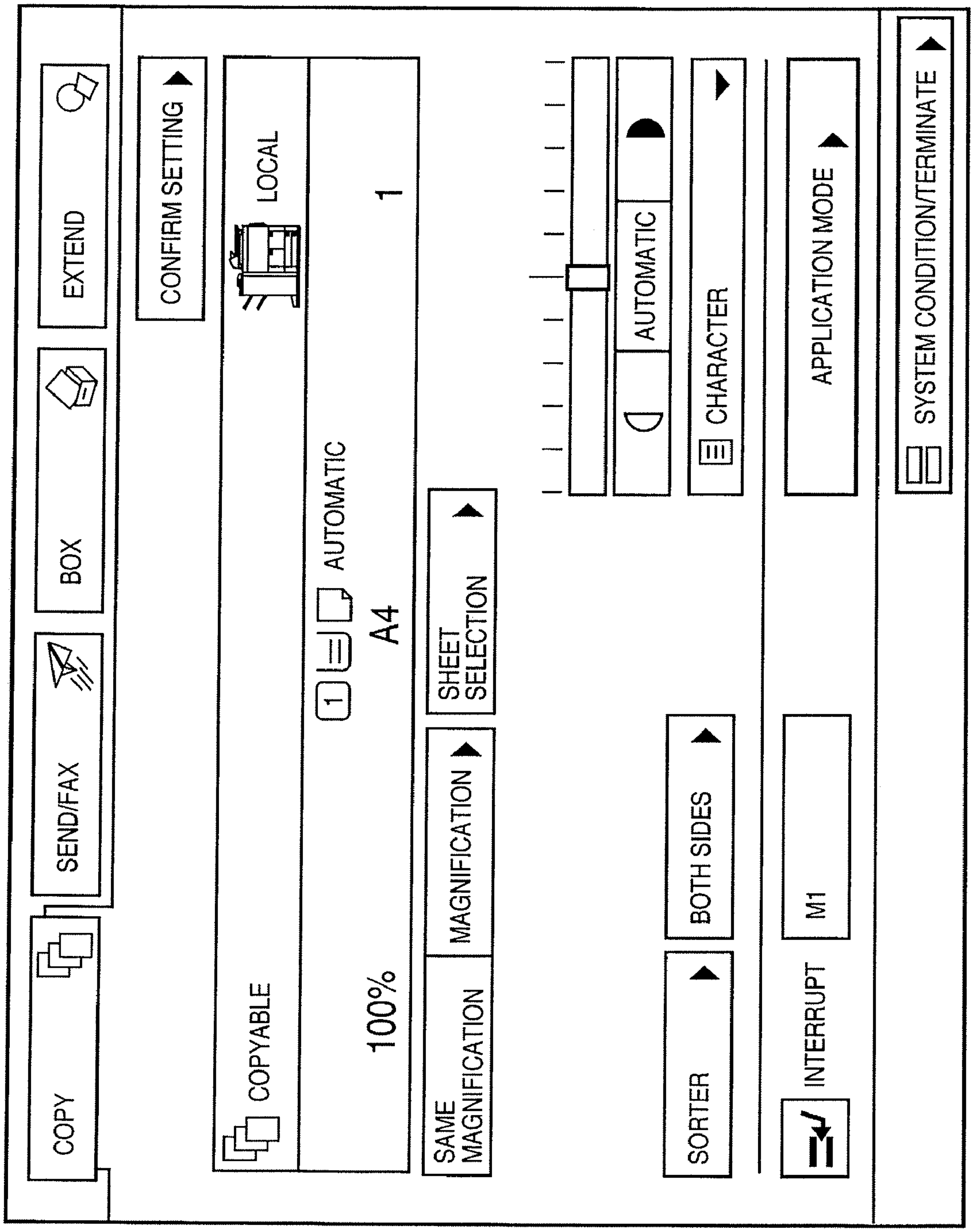
FIG. 6 is a diagram showing an example of an operation screen of a touch panel unit of the embodiment 1 of the present invention.

FIG. 6 is a diagram showing an example of an operation screen of a touch panel unit of the embodiment 1 of the present invention.

The touch panel unit 602 is configured by an LCD (liquid crystal display) unit and a touch panel display constituted by transparent electrodes and attached over the LCD. Here, processes, such as displaying a different operation screen when it is detected that transparent electrodes corresponding to a key displayed on the LCD are touched by a finger, have been programmed in advance. FIG. 6 shows an initial screen displayed when the mode is a standby mode, and various operation screens can be displayed according to a setting operation.

In this example, four functions of "copy", "send/FAX", "box" and "extend" are provided as function panels of this system, and each of the function names is displayed in a tab.

A copy tab is a tab key used to transition to an operation screen for a copy operation. A send tab is a tab key used to transition to an operation screen for instructing a send operation such as sending of facsimile or an e-mail. A box tab is a tab key used to transition to an operation screen for performing an input/output operation of a job in/from a box (storage means for storing a job for each user). An option tab is a tab key used to transition to a setting screen for setting extended capabilities such as scanner settings and printer settings. By selecting each of these tabs, it is possible to transition to each operation mode.

FIG. 6 shows that the "copy tab" has been selected. Here, it is displayed that the current magnification is 100%, that the selected sheet is A4, and that the number of copies to be made is one. It is also possible to change the copy density and to set the condition of finishing from keys such as a sorter key and a both-side key.

Next, description will be made on initial value setting processing for setting such initial values for case binding, with reference to FIGS. 7A and 7B.

Figure 7A:
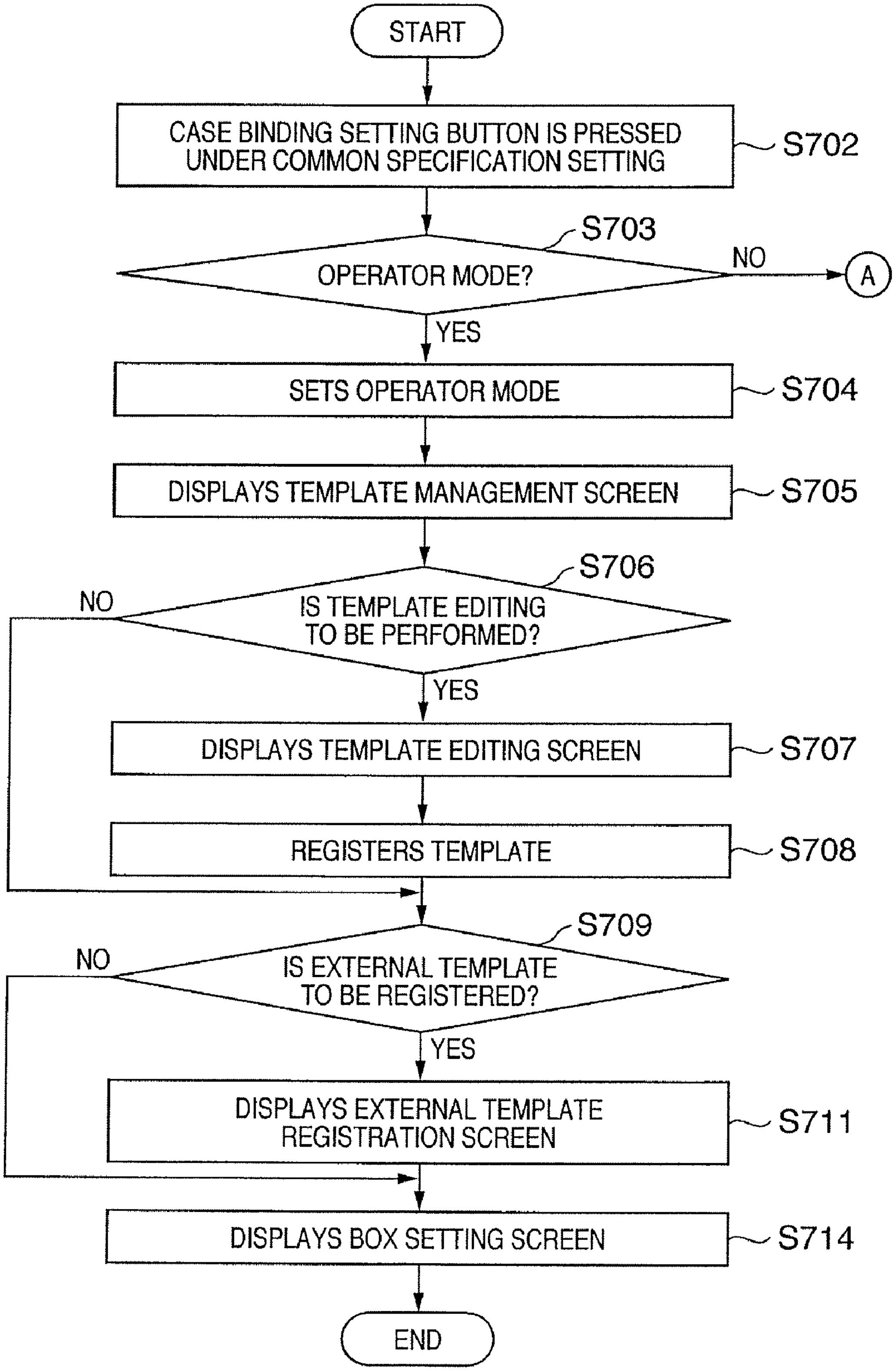
FIGS. 7A and 7B are flowcharts showing initial value setting processing of the embodiment 1 of the present invention.
Figure 7B:
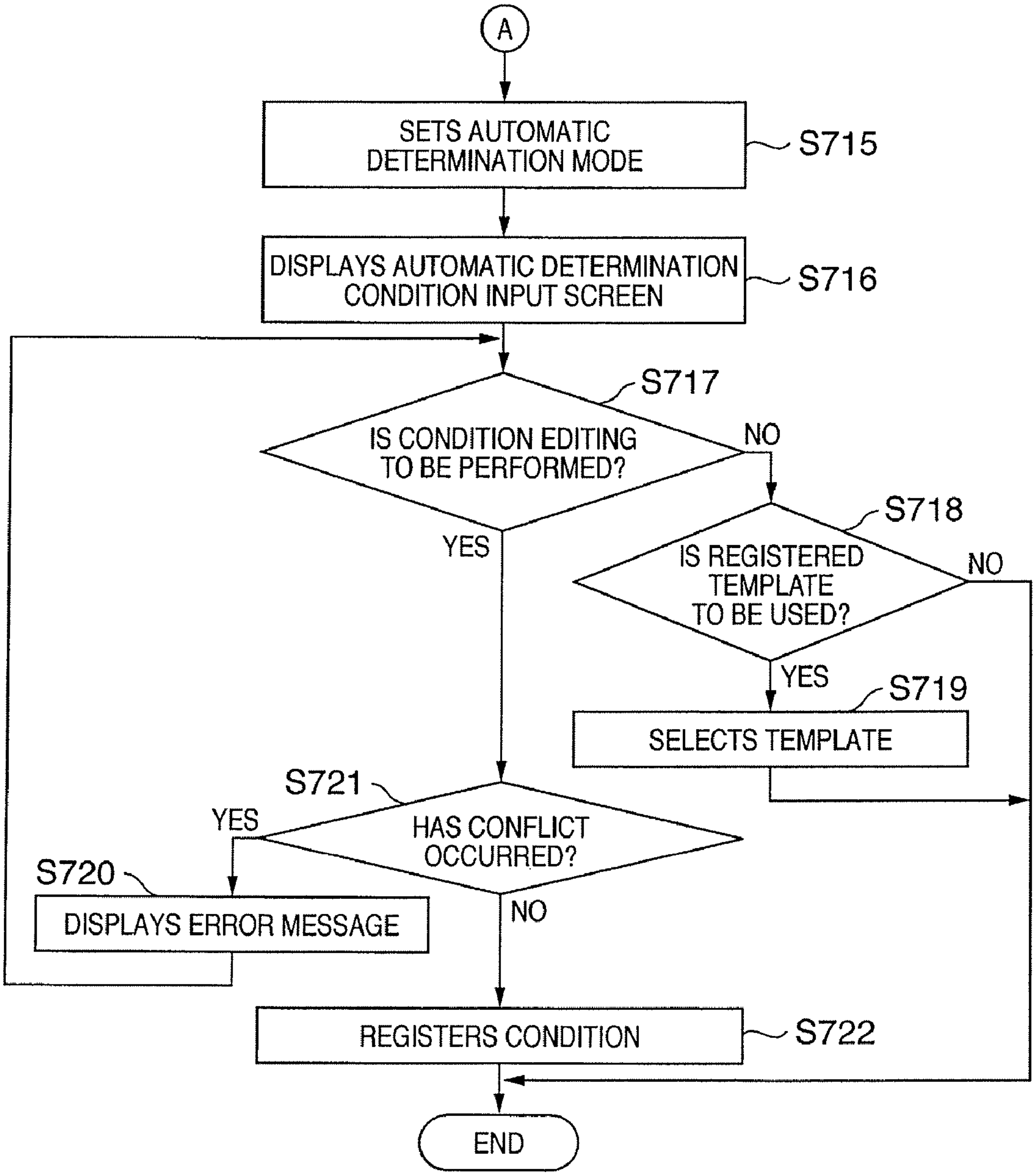

FIGS. 7A and 7B are flowcharts showing initial value setting processing of the embodiment 1 of the present invention.

The processing in FIGS. 7A and 7B is realized mainly by a dedicated program stored in the memory (RAM or ROM) of the job control unit 106 being executed under the control of the CPU of the job control unit 106 of the image forming apparatus of the present invention.

Figure 8:
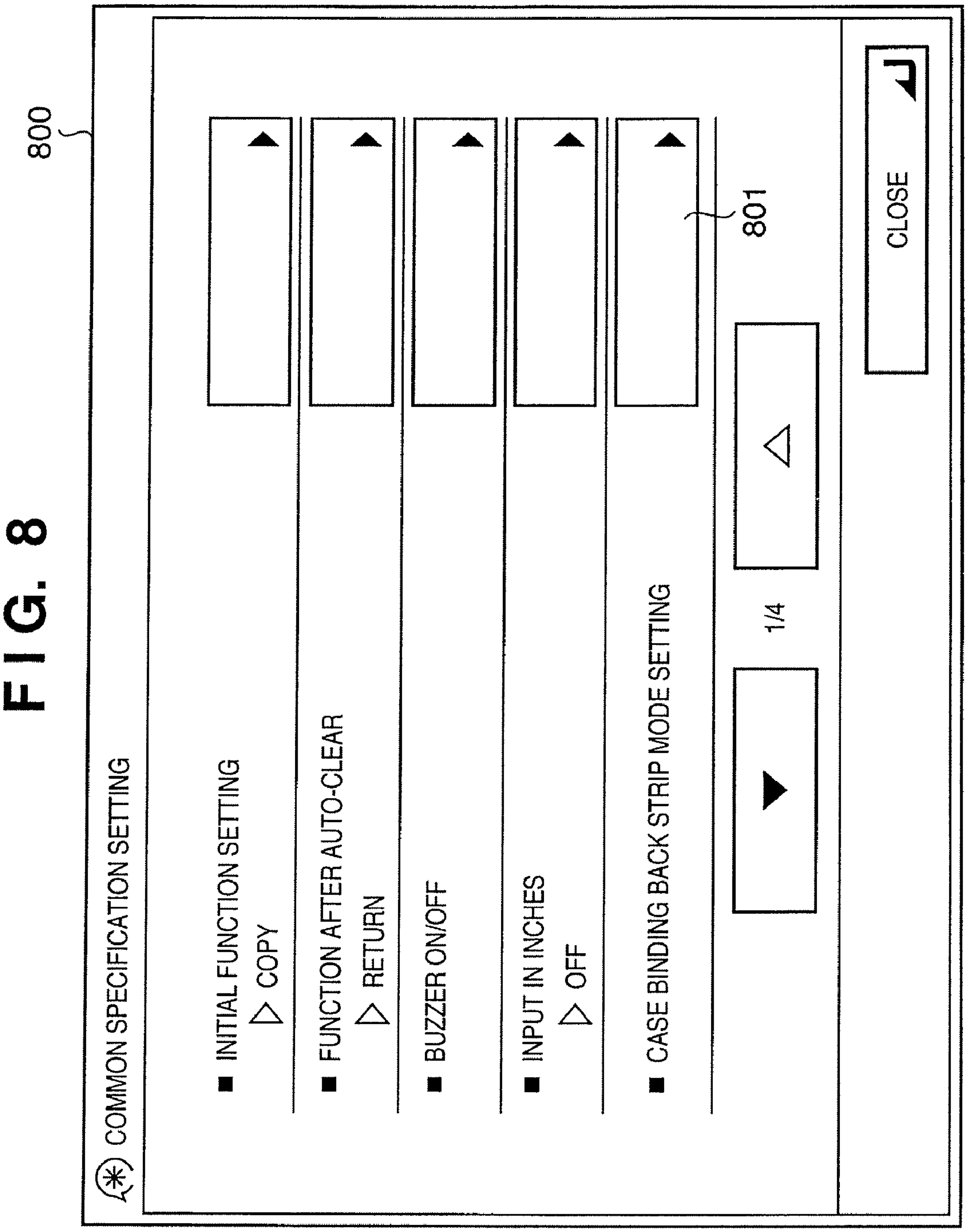
FIG. 8 is a diagram showing an example of a common specification setting screen of the embodiment 1 of the present invention.

First, at step S702, it is detected that the case binding setting button is pressed on the "common specification setting" screen (FIG. 8) which is an operation screen. As for the common specification setting on the operation screen, a concrete example is shown in FIG. 8. This "common specification setting" screen 800 can be displayed, for example, by operating the "extend tab" on the initial screen in FIG. 6.

In FIG. 8, buttons for executing setting of initial functions as common specifications for the system, executing functions after auto-clear, and the like are arranged. A "case-binding back-strip mode setting" button 801 is arranged as one of the buttons. When this "case-binding back-strip mode setting" button 801 is pressed, processing at step S702 occurs. When the "case-binding back-strip mode setting" button 801 is pressed, a case binding mode setting screen (FIG. 9) is displayed.

Figure 9:
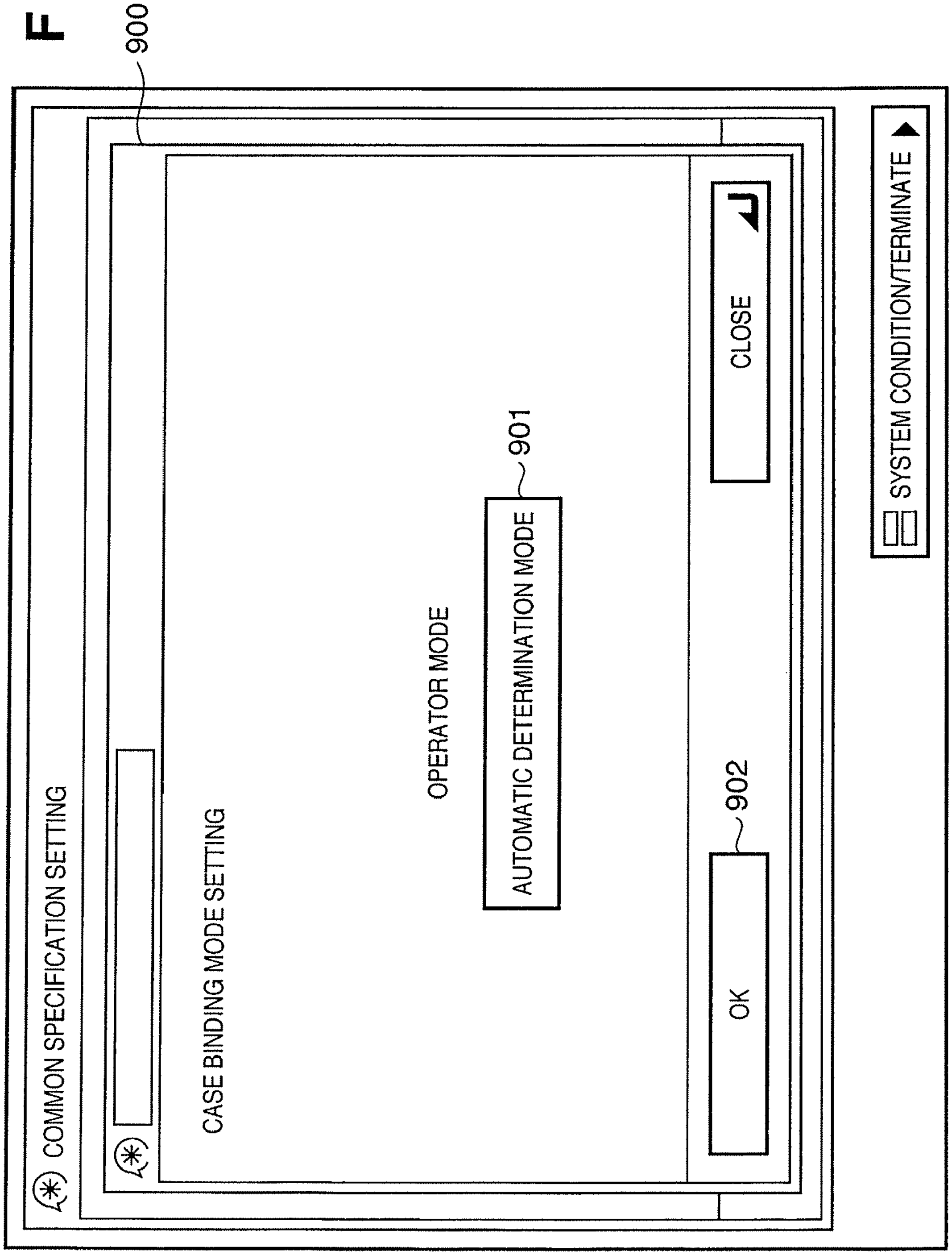
FIG. 9 is a diagram showing an example of a case binding mode setting screen of the embodiment 1 of the present invention.

This case binding mode setting screen 900 is a screen for selecting any of an operator mode and an automatic determination mode as a case binding mode for executing case binding processing when a job for case binding is inputted. On the case binding mode setting screen 900, buttons for selecting the respective modes are arranged, and FIG. 9 shows that the automatic determination mode 901 has been selected. When an OK button 902 is pressed during this state, it is determined that the automatic determination mode has been selected.

The operator mode is a mode in which an operator who manages an inputted job for case binding sets attribute information for the job for case binding himself. Meanwhile, the automatic determination mode is a mode in which the system automatically determines attributes of a job for case binding in accordance with conditions specified by an operator and manages them as attributes information.

The attributes information means attributes to be given to page image data constituting a job. These attributes are information for identifying a cover of case binding. The bookbinding cover attributes are, for example, "front side of case binding cover" and "backside of case binding cover". In addition, "back strip of case binding cover" and "body other than case binding cover" may be used. These attributes can be given to each page image data or page area in a job.

If the size of an inputted document is not the physical size of a printing sheet to be used for a cover but the size of a divided page obtained after folding processing for case binding is performed, then attributes of "front side of case binding cover (right)" and "front side of case binding cover (left)" can be further given as the attribute of "front side of case binding cover". Similarly, attributes of "backside of case binding cover (right)" and "backside of case binding cover (left)" can be also given as the attribute of "backside of case binding cover".

At step S703 (FIG. 7A), it is determined whether or not the mode selected by the operator is the operator mode. If the selected mode is not the operator mode (step S703: NO), that is, if the selected mode is the automatic determination mode, then the processing transitions to automatic determination mode setting processing via an automatic determination condition input screen (FIG. 10).

Specifically, the automatic determination mode is set at step S715 first (FIG. 7B). In this case, mode information indicating that the selected mode is the automatic determination mode is stored as initial setting information, for example, in the resource management unit 112. Next, at step S716, the automatic determination condition input screen (FIG. 10) for setting a condition for automatically determining the attributes of a job for case binding in the automatic determination mode is displayed.

Figure 10:
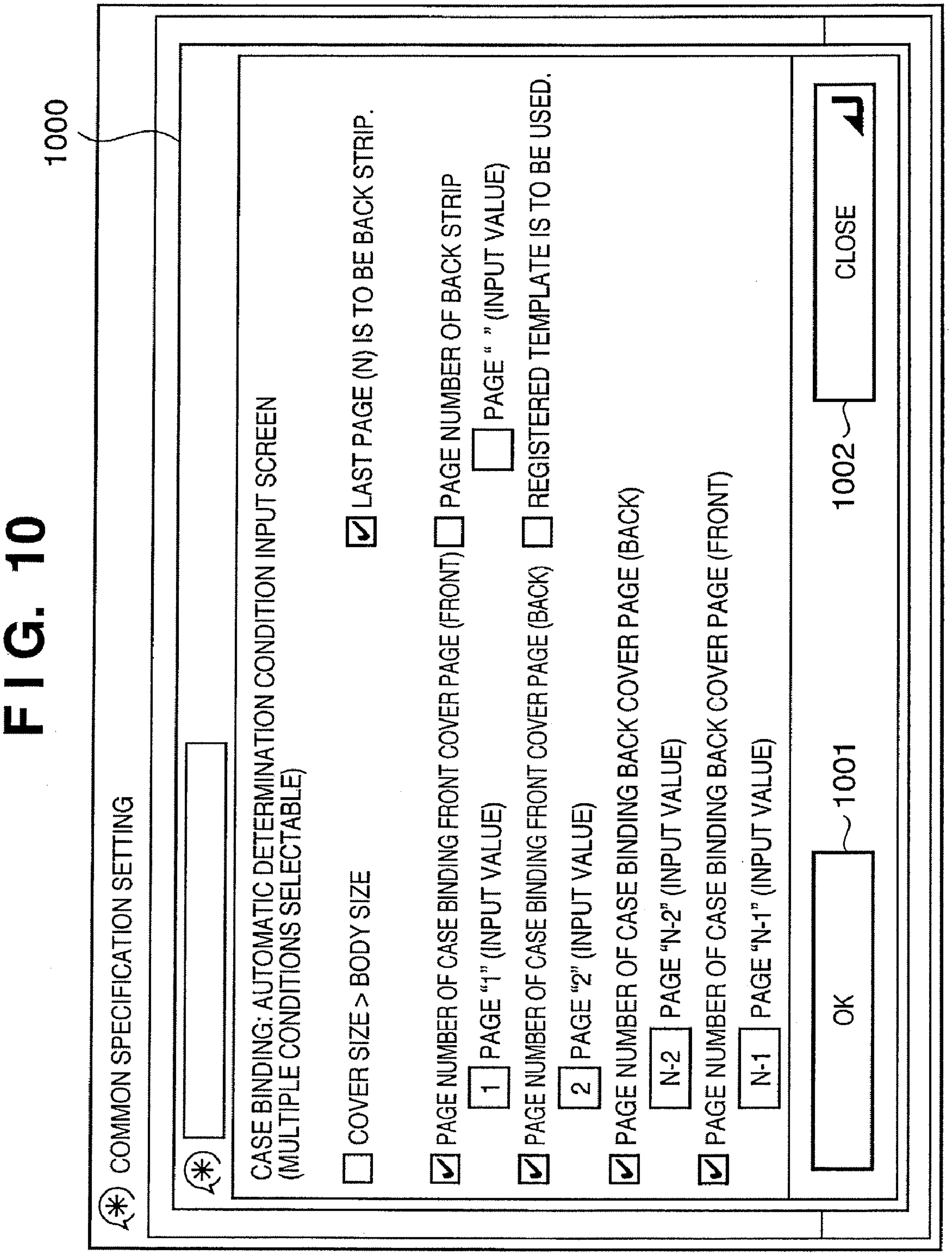
FIG. 10 is a diagram showing an example of an automatic determination condition input screen of the embodiment 1 of the present invention.

On the automatic determination condition input screen 1000 shown in FIG. 10, various conditions for executing processing related to case binding are registered in advance. Checkboxes are provided for the various conditions, and a user can select one or more desired conditions by checking the checkboxes. For some conditions, an input field for inputting a desired numerical value is provided.

To determine selection after selecting a condition on this automatic determination condition input screen 1000, an OK button 1001 is pressed. If the selection is not to be determined, a close button 1002 is pressed. Especially, when the OK button 1001 is pressed and multiple conditions have been selected, then processing for determining whether or not the combination of the conditions is appropriate (in other words, whether or not there is a conflict) is performed.

If a lot of conditions are registered, multiple pages are used to display them, and they are dividedly displayed. If a condition is to be exclusively selected, radio buttons may be provided.

In the example of FIG. 10, the following conditions are registered:

Cover size>body size;

Page number of case binding front cover page (front): page "1" (input value);

Page number of case binding front cover page (back): page "2" (input value);

Page number of case binding back cover page (back): page "N−2" (input value);

Page number of case binding back cover page (front): page "N−1" (input value);

The last page (N) is to be back strip;

Page number of back strip: page " " (input value);

Registered template is to be used; and the like.

Each condition will be described below.

The condition of "cover size>body size" indicates that the cover size is always larger than the body size in the attributes of a received job. This is a condition that a page with a larger sheet size is exclusively regarded as a cover through comparison of all pages with one another. In this case, a condition, for example, a condition indicating that the page inputted first is to be the front side of the cover and the page inputted next is to be the back, is registered in advance or additionally registered.

The condition of "page number of case binding front cover page (front): page "1"" is a condition that a specified page should be set as the front side of the front cover page in the attributes of the received job. In the example of FIG. 10, it is set that the first page is always to be the front side of the front cover page.

The condition of "page number of case binding front cover page (back): page "2"" is a condition that a specified page should be set as the backside of the front cover page in the attributes of the received job. In the example of FIG. 10, it is set that the second page is always to be the backside of the front cover page.

The condition of "page number of case binding back cover page (back): page "N−2"" is a condition that a specified page should be set as the backside of the back cover page in the attributes of the received job. In the example of FIG. 10, it is set that the third page from the last page is always to be the backside of the back cover page, where N is the last page of the received data.

The condition of "page number of case binding back cover page (front): page "N−1"" is a condition that a specified page should be set as the front side of the back cover pages in the attributes of the received job. In the example of FIG. 10, it is set that the second page from the last page is always to be the front side of the back cover page, wherein N is the last page of received data.

The condition of "the last page (N) is to be back strip" is a condition that the last page should be always set as the back strip in the attributes of the received job, wherein N is the last page of received data.

The condition of "page number of back strip: page " "" is a condition that a specified page should be set as the back strip in the attributes of the received job.

Figure 1A:
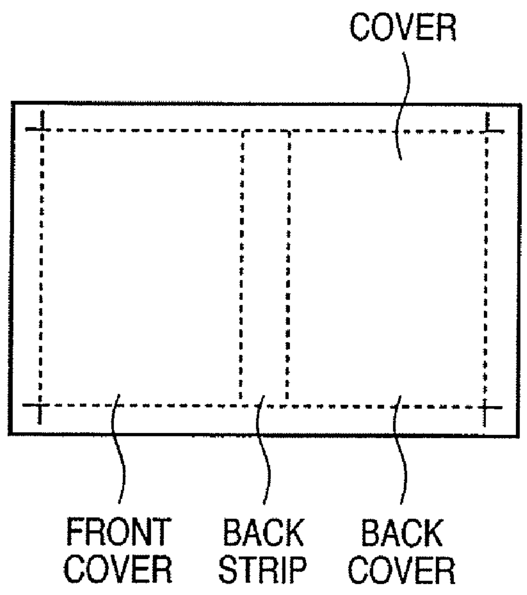
FIGS. 1A to 1C are diagrams for illustrating case binding.
Figure 1B:
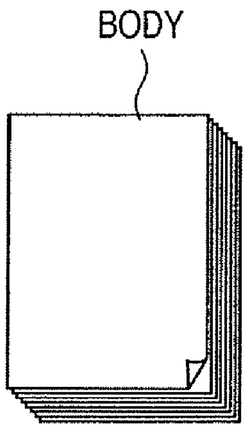
Figure 1C:
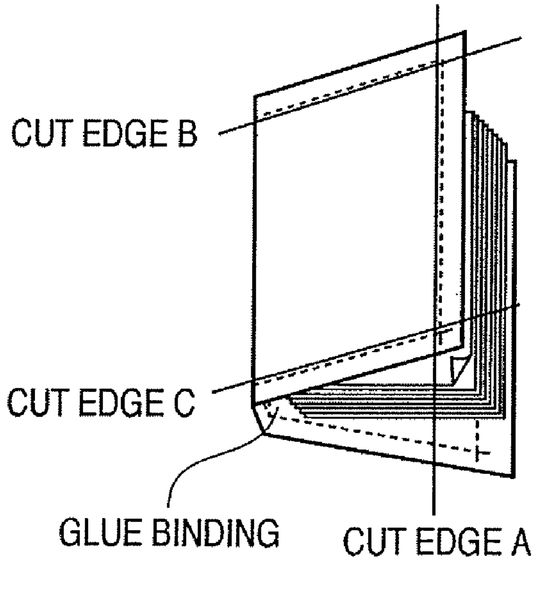
Figure 2A:
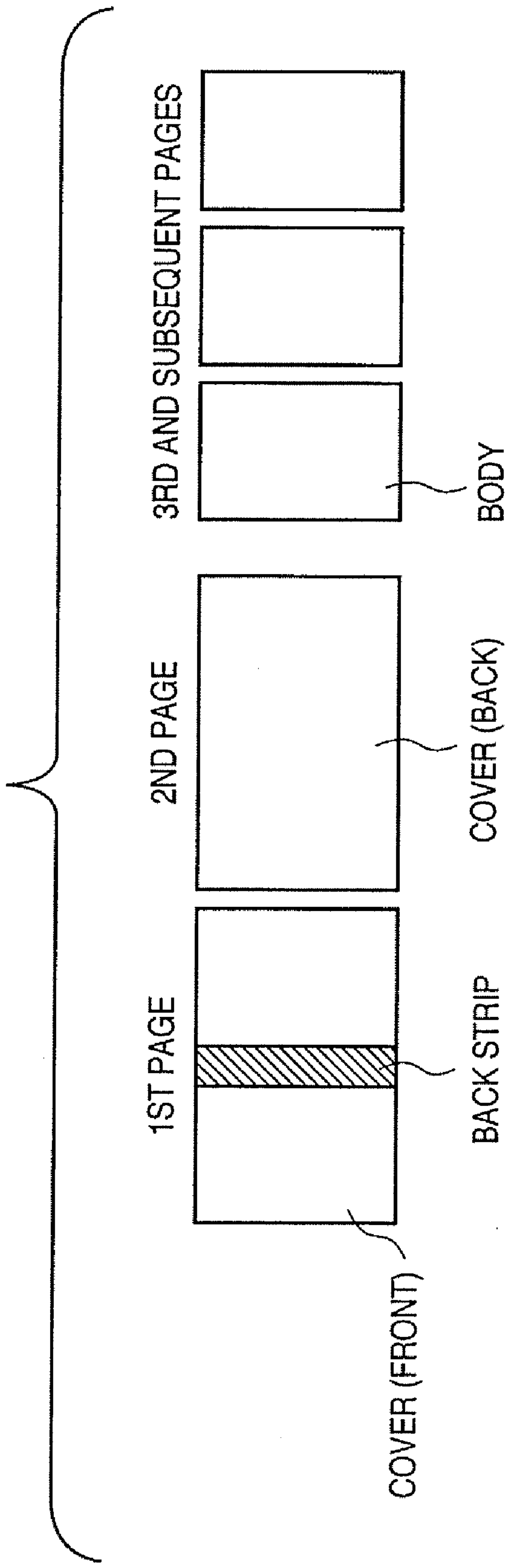
FIGS. 2A and 2B are diagrams for illustrating the sequence of pages constituting a job.
Figure 2B:
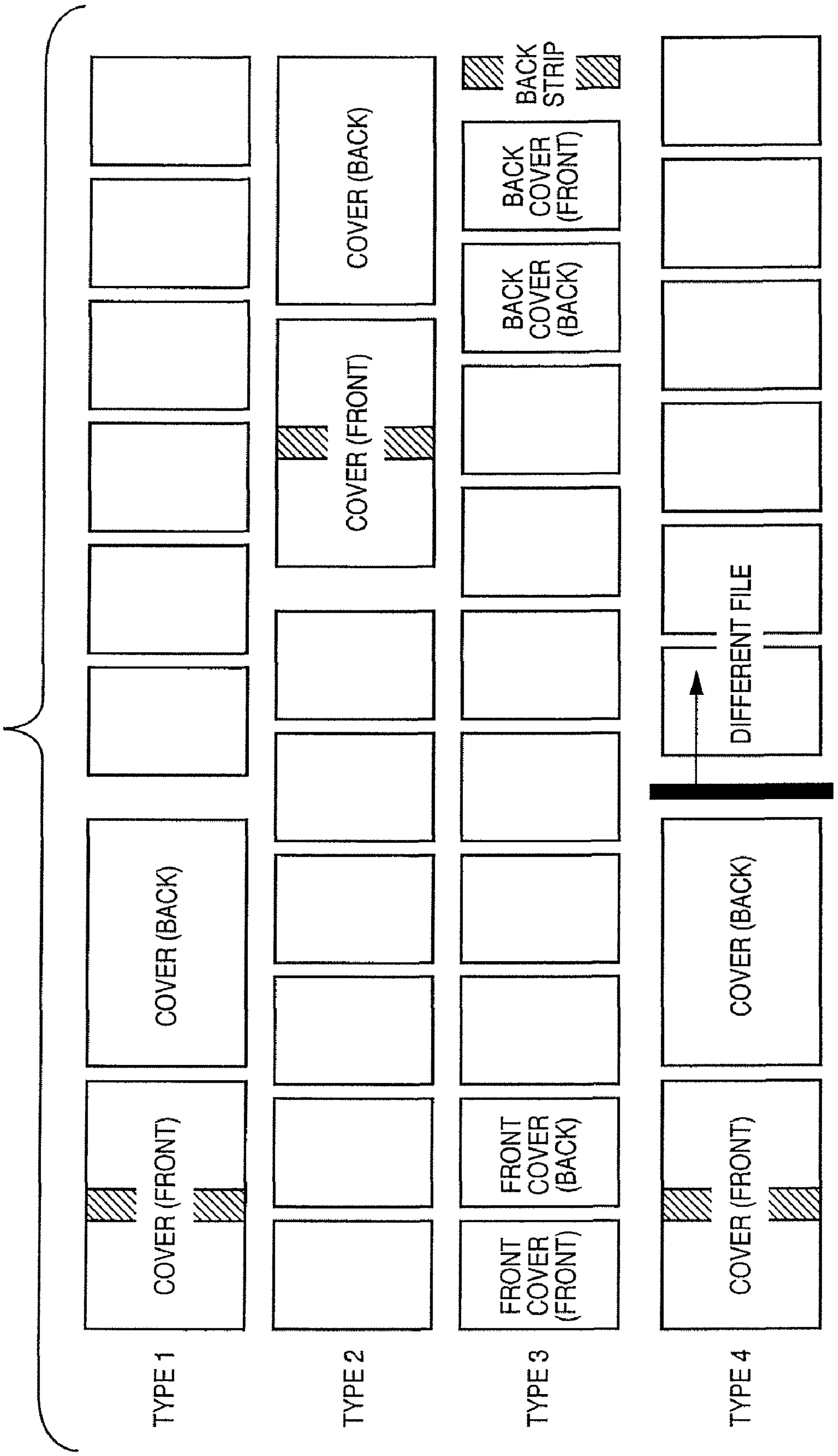

The condition of "registered template is to be used" is a condition that attributes should be set for a job with the use of a template registered in advance. Registered templates are managed, for example, by the resource management unit 112, and templates showing the various types of patterns as shown in FIG. 2B are managed as patterns of a sequence of pages for case binding.

In FIG. 10, the following are selected as the conditions:

Page number of case binding front cover page (front): page "1" (input value);

Page number of case binding front cover page (back): page "2" (input value);

Page number of case binding back cover page (back): page "N−2" (input value);

Page number of case binding back cover page (front): page "N−1" (input value); and The last page (N) is to be back strip.

Figure 11:
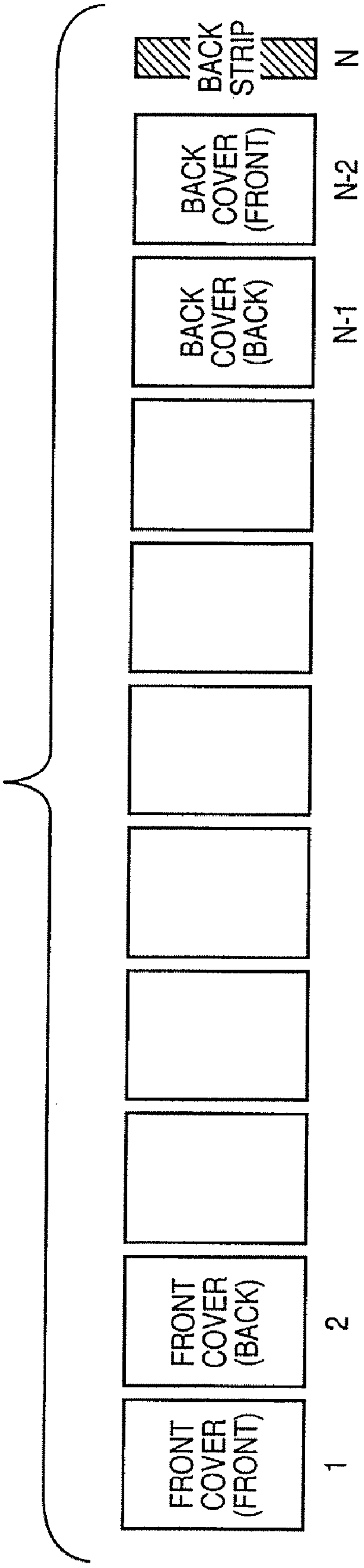
FIG. 11 is a diagram showing an example of a sequence of pages of the embodiment 1 of the present invention.

This selection has been made in consideration of the pattern of a sequence of pages shown in FIG. 11.

After that, at step S717, it is determined whether or not condition editing via the automatic determination condition input screen 1000 has been performed. This determination is made by monitoring an operation performed on the automatic determination condition input screen 1000. The determination here is made based on whether or not an operation of checking a checkbox for any condition other than the condition "registered template is to be used" has been performed on the automatic determination condition input screen 1000. If a checkbox for any condition other than the condition of "registered template is to be used" is checked, then it is determined that condition editing is to be performed.

As a result of the monitoring, if it is determined that condition editing is to be performed (step S717: YES), then a condition editing operation by the user is monitored, and the processing proceeds to step S721 if the OK button 1001 (FIG. 10) is pressed. At step S721, if multiple conditions are selected, then it is determined whether or not there is a conflict in the combination of the conditions (whether or not the combination is appropriate).

As described above, in the automatic determination mode, it is possible to register various conditions on the automatic determination condition input screen 1000, and it is also possible for a person who makes settings to select multiple conditions or a single condition. However, when multiple conditions are selected, it may happen that conditions which conflict with each other are selected. For example, if the following two conditions are selected:

Page number of case binding front cover page (front): page "1" (input value); and Page number of case binding front cover page (back): page "1" (input value), then two attributes are set for the same one page (the two attributes conflict with each other). In such a case, when a job is actually received, job processing for the job cannot be normally executed.

Figure 12:
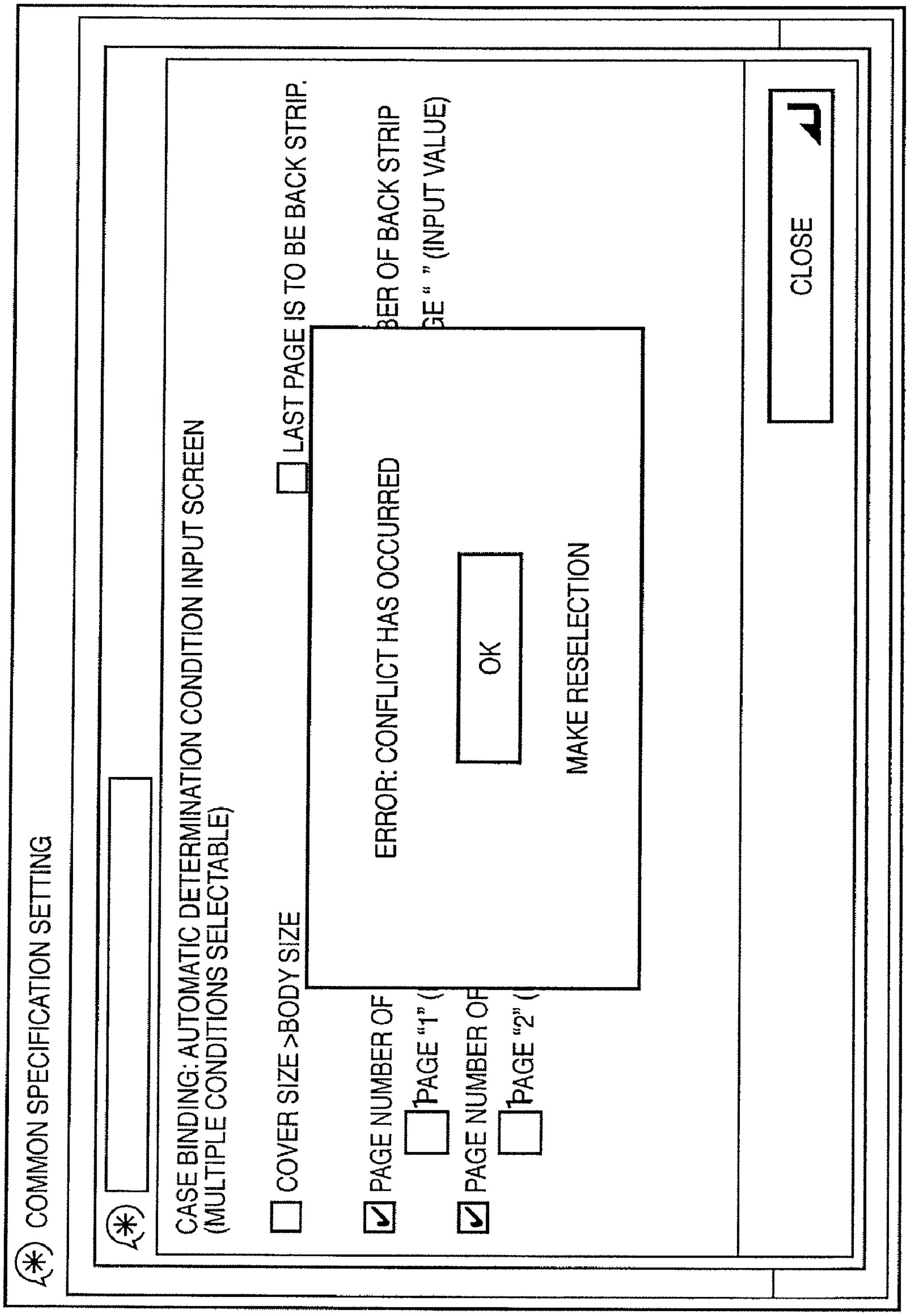
FIG. 12 is a diagram showing an example of an error message of the embodiment 1 of the present invention.

Therefore, if multiple conditions are selected, it is determined at step S721 whether or not the combination of conditions is appropriate. As a result of the determination, if a conflict has occurred (step S721: YES), the processing proceeds to step S720 and displays an error message (FIG. 12) to that effect. This error message is realized by a dialog as shown in FIG. 12, and this makes it possible to prompt an operator to set conditions again or cancel the setting on the automatic determination condition input screen 1000.

On the other hand, if a conflict has not occurred (step S721: NO), condition information indicating the selected conditions is registered, for example, with the resource management unit 112 as initial setting information at step S722.

Figure 13:
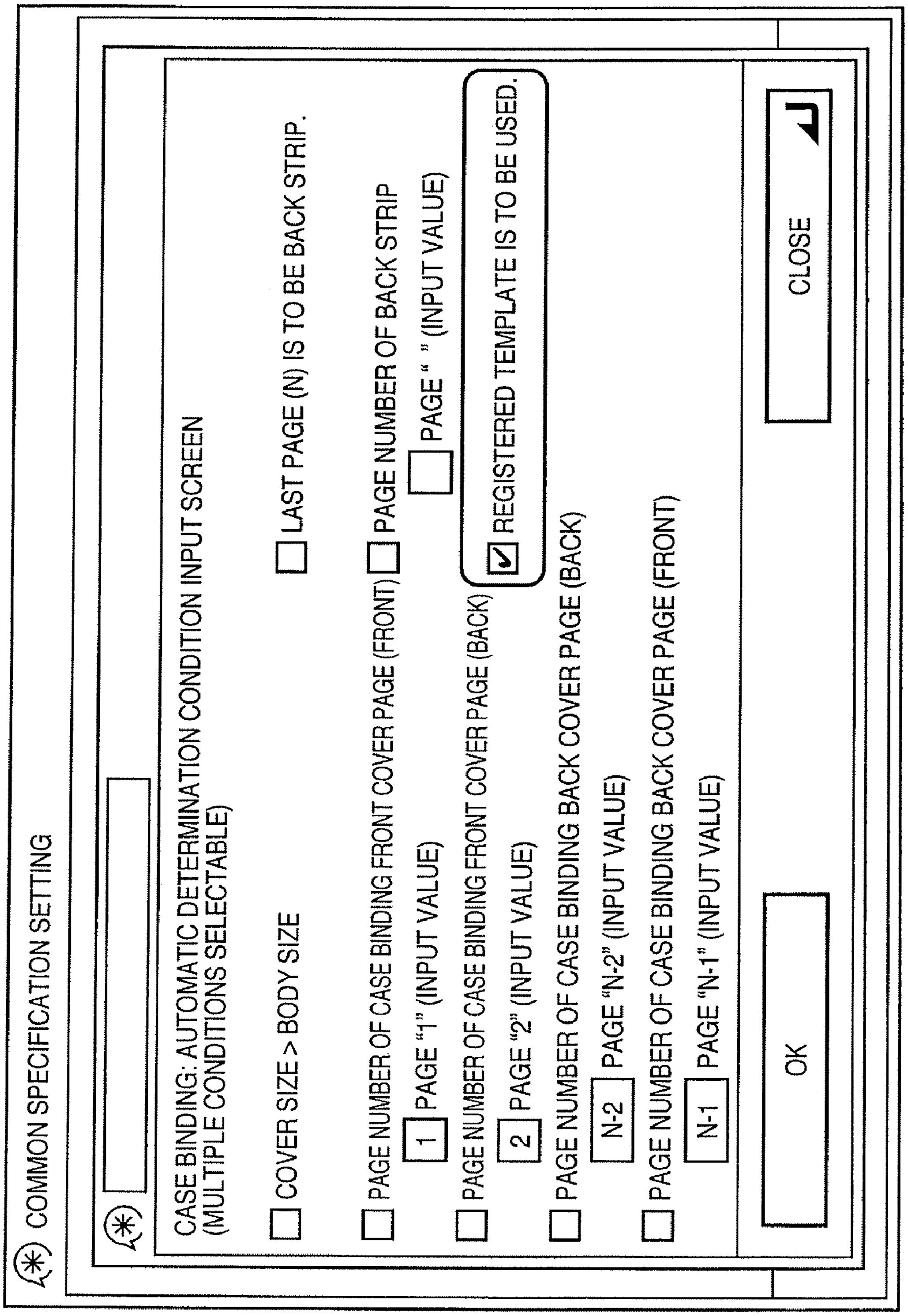
FIG. 13 is a diagram showing an example of an automatic determination condition input screen of the embodiment 1 of the present invention.

Meanwhile, in the case where condition editing is not to be performed at step S717 (step S717: NO), then the processing proceeds to step S718 without making a combination of conditions. The case where condition editing is not to be performed means the case where an operation of checking a checkbox for any condition other than the condition of "registered template is to be used" is not made. In this case, however, since the condition of "registered template is to be used" may have been selected, it is determined at step S718 whether or not a registered template is to be used. This determination is made based on whether or not the checkbox for the condition of "registered template is to be used" is checked. If the checkbox for the condition of "registered template is to be used" is checked as shown in FIG. 13, it is determined that a registered template is to be used.

If the close button 1002 (FIG. 10) is pressed when a registered template is not to be used (step S718: NO), that is, the checkboxes for all the conditions including the condition of "registered template is to be used" are unchecked, then the processing ends. In this case, conditions for automatically determining attributes of a job for case binding are not especially set.

On the other hand, if a registered template is to be used (step S718: YES), then, at step S719, a template management screen (FIG. 14) for managing registered templates is displayed, and a template is selected based on an operation made on the template management screen.

Figure 14:
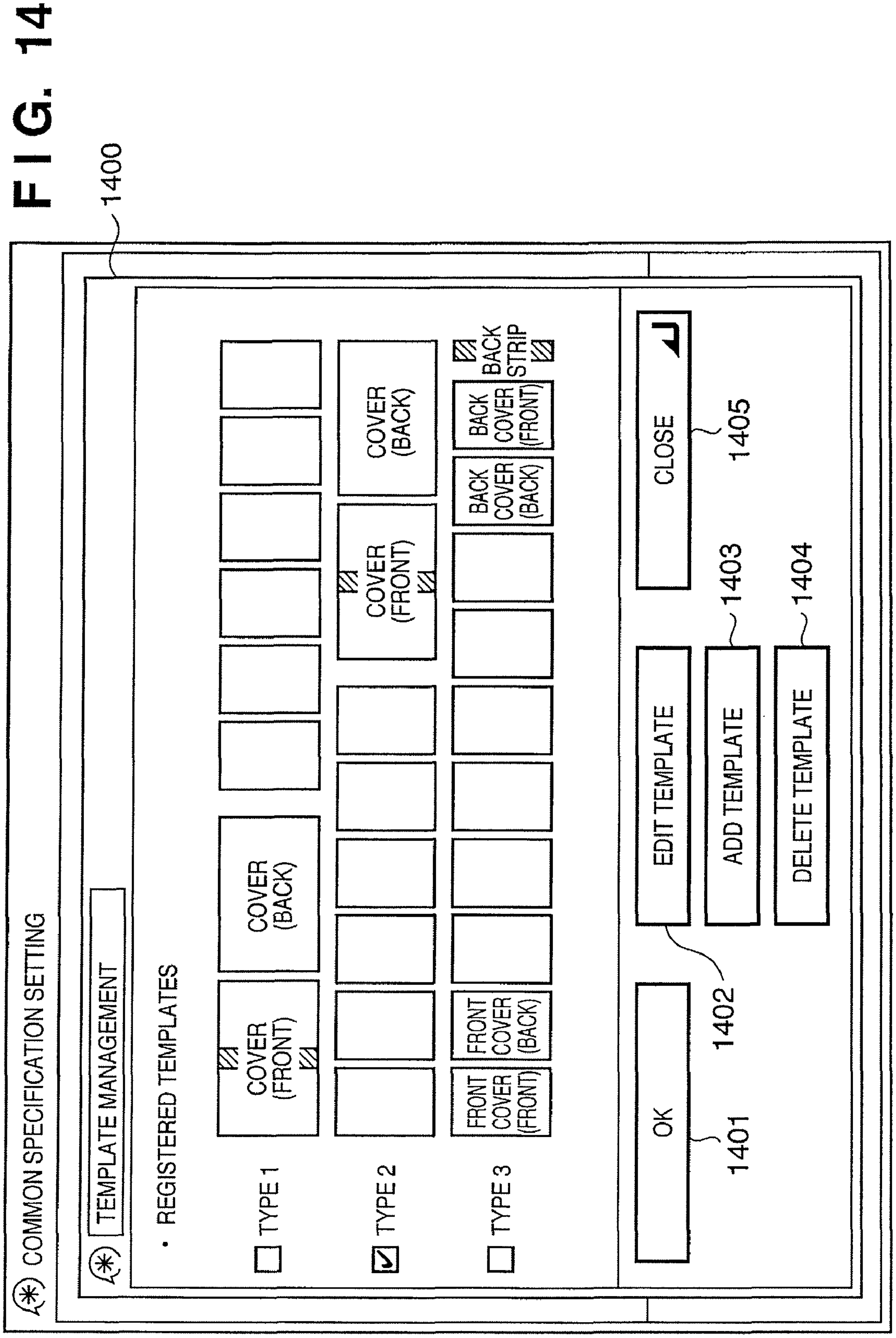
FIG. 14 is a diagram showing an example of a template management screen of the embodiment 1 of the present invention.

On the template management screen 1400 shown in FIG. 14, a list of templates registered with the resource management unit 112 is displayed. By checking a checkbox prepared for each template, the user can select a desired template from this list. FIG. 14 shows that the template of Type 2 is selected. When an OK button 1401 is pressed in this state, the selection of the template is determined, and the conditions specified by the template (a sequence of pages) are registered, for example, with the resource management unit 112 as initial setting information.

In the determination on condition editing at step S717, it is determined whether or not condition editing is to be performed, separately for the condition of "registered template is to be used" and for the other conditions. However, the determination is not limited thereto. For example, when the checkbox for the condition of "registered template is to be used" is checked, it may be determined to be condition editing, similarly to the case of the other conditions. In this case, the processes at steps S718 and S719 are to be executed after step S717.

When the condition of "registered template is to be used" is selected in the above configuration, it is determined at step S721 whether or not there is a conflict between the condition of a sequence of pages specified by a selected template and the other conditions on the automatic determination condition input screen 1000.

The processing described above is the initial value setting processing performed in the case of using the automatic determination mode. Next, description will be made on initial value setting processing performed in the case of using the operator mode.

If the selected mode is the operator mode at step S703 (step S703: YES) in FIG. 7A, then the processing proceeds to step S704 and sets the operator mode. In this case, mode information indicating that the selected mode is the operator mode is registered, for example, with the resource management unit 112 as initial setting information.

Figure 15:
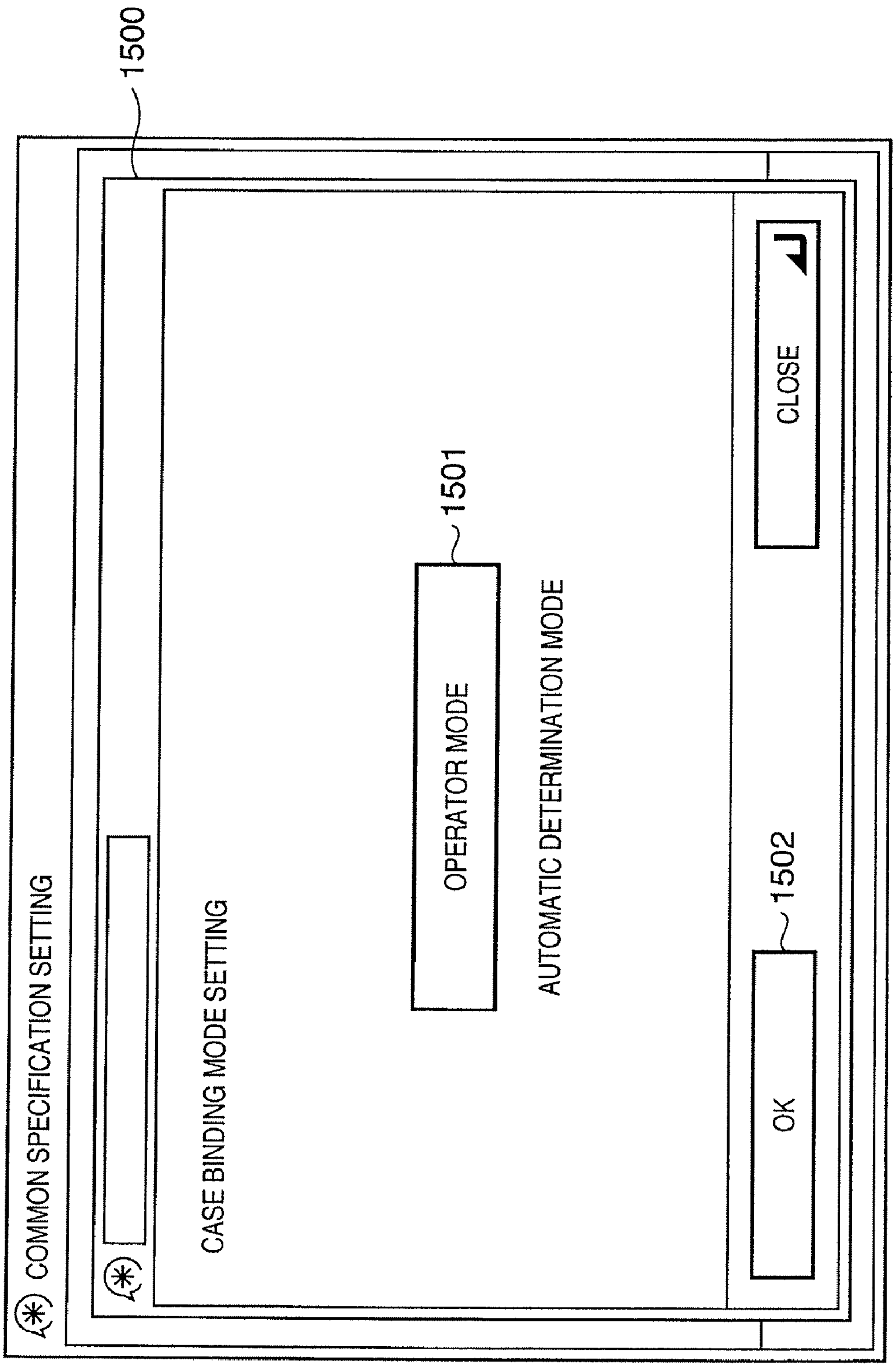
FIG. 15 is a diagram showing an example of a case binding mode setting screen of the embodiment 1 of the present invention.

When the operator mode is selected, the display on the case binding mode setting screen 900 (FIG. 9) is changed to the display on a case binding mode setting screen 1500 shown in FIG. 15 where an operator mode 1501 is selected. When an OK button 1502 is pressed in this state, it is determined that the operator mode has been selected.

At step S705, the template management screen 1400 (FIG. 14) for managing templates is displayed. On the template management screen 1400, a list of templates registered with the system in advance is displayed, and it is possible to select a desired template from the list of templates, and edit or delete it. It is also possible to add a new template.

In the case of editing a template, by pressing an edit template button 1402 while the template to be edited is being selected, a template editing screen (FIG. 16) for editing the template can be displayed.

Figure 16:
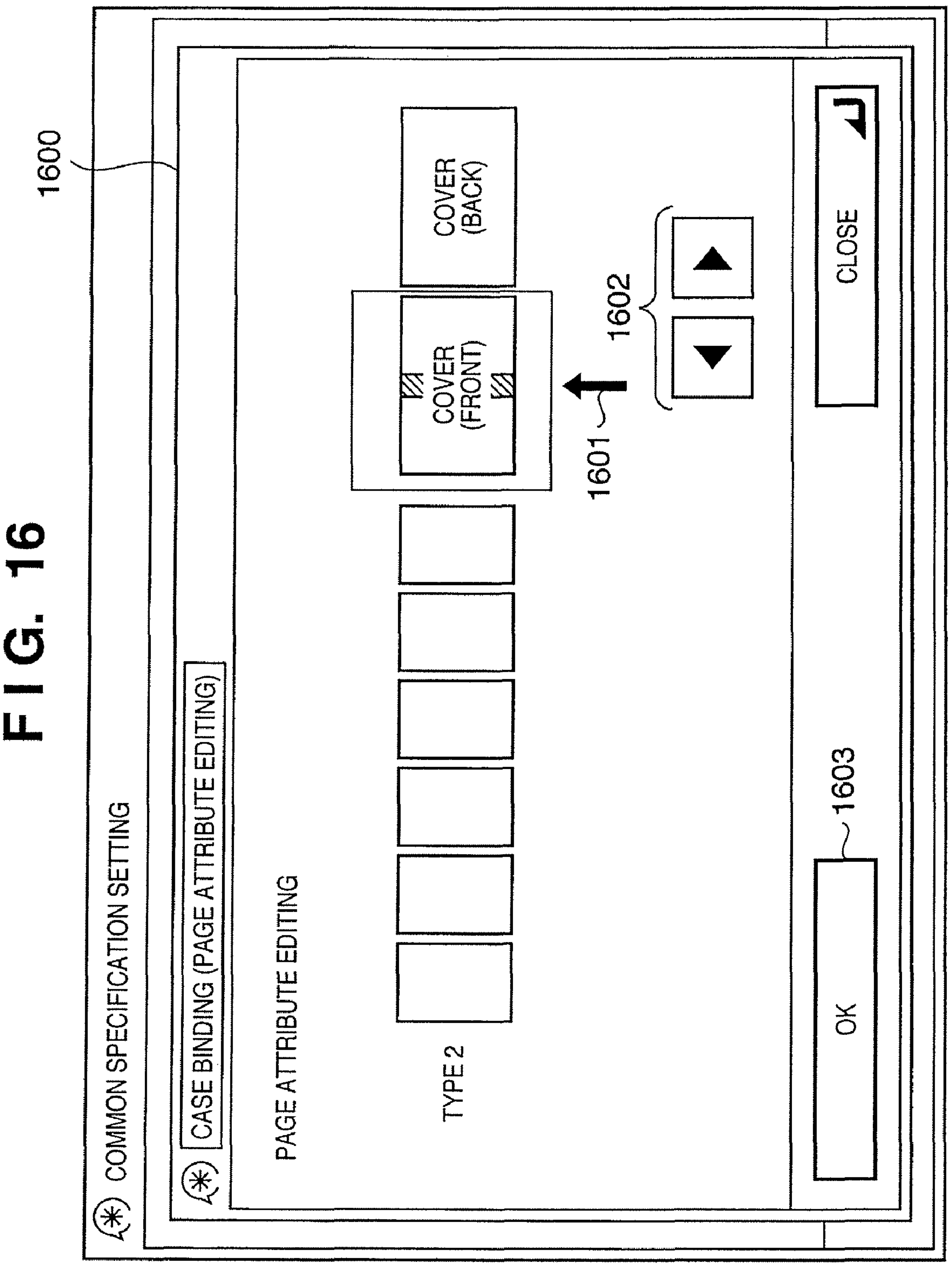
FIG. 16 is a diagram showing an example of setting for the case binding mode of the embodiment 1 of the present invention.

On the template editing screen 1600 shown in FIG. 16, a sequence of pages specified by the selected template is displayed. By operating a cursor 1601 indicating a page to be processed and an operation key 1602 for horizontally operating the cursor 1601, the user can change the position of the page to be processed. Then, when an OK button 1603 is pressed after the position is changed, the template updated with the changed content is registered.

The template editing screen 1600 in FIG. 16 shows an example where a position in a sequence of pages specified by a template is changed, as the content of editing. However, it is also possible to newly add or change the attribute of a page. This will be described later.

In the case of adding a template on the template management screen 1400, by pressing an add template button 1403, an external template registration screen (FIG. 17) for importing a template to be added can be displayed. With the use of this external template registration screen, it is possible to select a desired template from among templates stored in a predetermined storage place (for example, a box) and add It.

In the case of deleting a template, by pressing a delete template button 1404 while a template to be deleted is being selected, the template can be deleted.

Now, let's return to the description of FIG. 7A.

At step S706, it is determined whether or not template editing is to be performed via the template editing screen 1600. This determination is made based on whether or not the edit template button 1402 of the template editing screen 1600 has been pressed, by monitoring an operation on the template management screen 1400. If the edit template button 1402 is pressed, then it is determined that template editing is to be performed. Meanwhile, if a close button 1405 is pressed while a template is not selected, then it is determined that template editing is not to be performed.

As a result of the monitoring, if template editing is not to be performed (step S706: NO), then the processing proceeds to step S709. On the other hand, if template editing is to be performed (step S706: YES), then the processing proceeds to step S707 and the template editing screen 1600 is displayed. Then, editing of a template via the template editing screen 1600 is executed. After that, when the OK button 1603 is pressed, the edited template is registered with the resource management unit 112 at step S708.

As the template editing, it is also possible to additionally register a template generated by an external application (external equipment) as a new template. This is executed with the use of the external template registration screen (FIG. 17), which is displayed by pressing the add template button 1403 on the template management screen 1400.

At step S709, it is determined whether or not registration of an external template has been instructed. If registration of an external template has not been instructed (step S709: NO), then the processing proceeds to step S714. On the other hand, if registration of an external template has been instructed (step S709: YES), then the processing proceeds to step S711 and displays the external template registration screen (FIG. 17).

Figure 17:
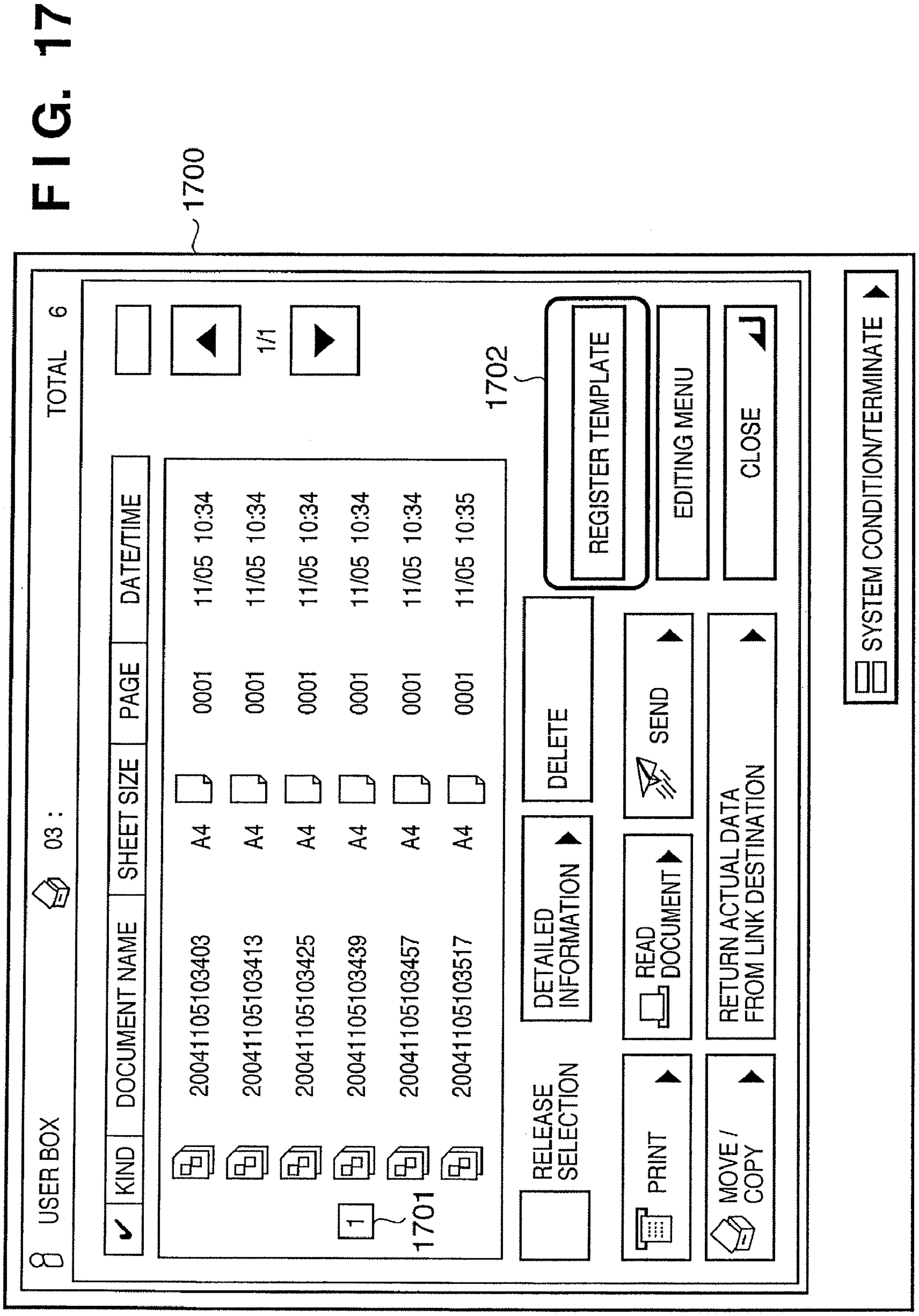
FIG. 17 is a diagram showing an example of a template editing screen of the embodiment 1 of the present invention.

On the external template registration screen 1700 shown in FIG. 17, it is possible to import a template generated by an external application (an external template). Specifically, a list of importable external templates is displayed on the external template registration screen 1700.

When the user presses a register template button 1702 while a desired external template (for example, an external template 1701) is being selected from this list, the selected external template is imported into the system. The imported external template is added to the list of templates on the template management screen 1400.

When the template editing or the external template registration as described above ends, a box setting screen (FIG. 18) for specifying a box to be an area where a job for case binding is to be stored is displayed.

Figure 18:
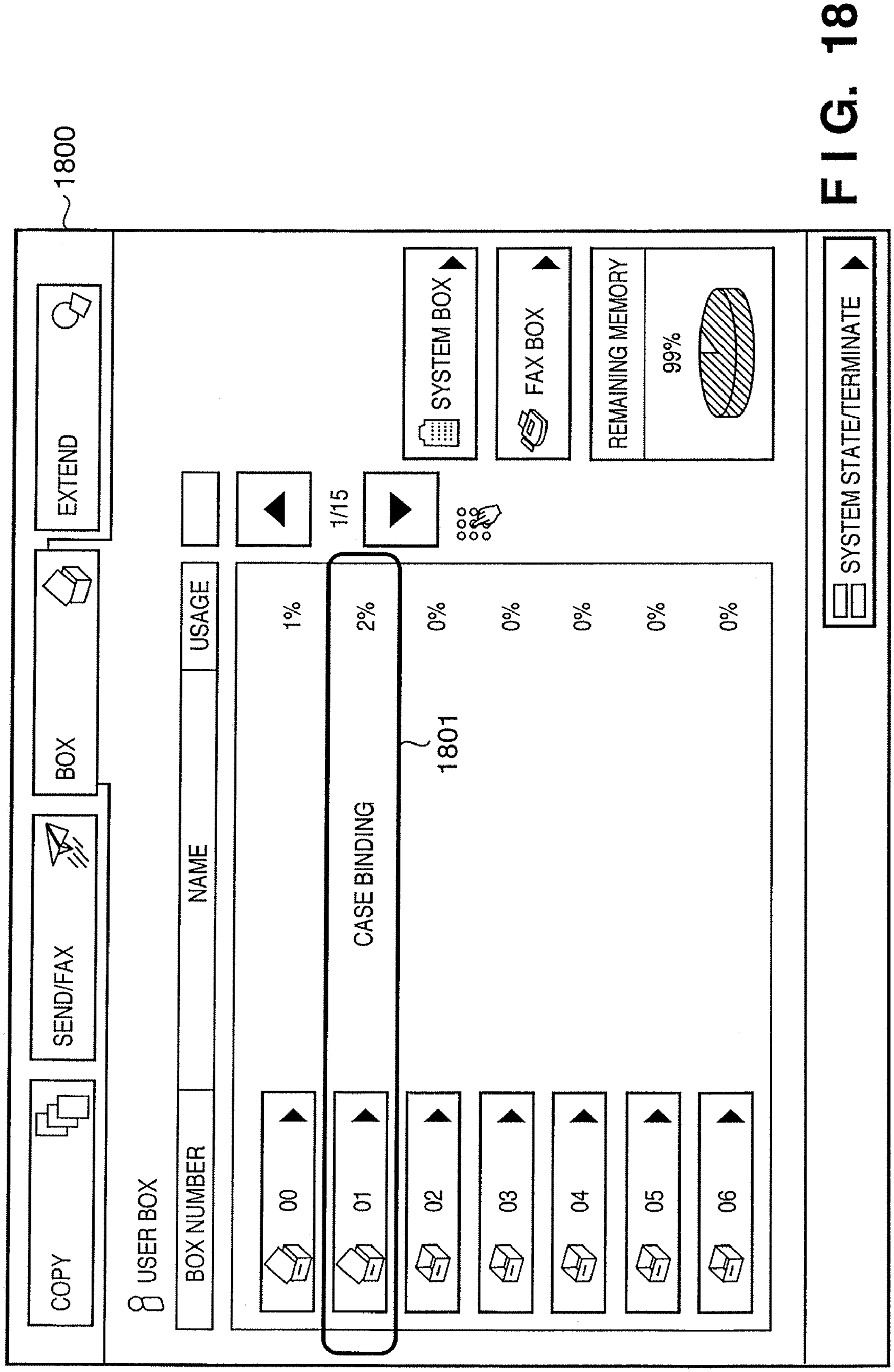
FIG. 18 is a diagram showing an example of a box setting screen of the embodiment 1 of the present invention.

A list of empty boxes is displayed on the box setting screen 1800 shown in FIG. 18, and the user can select a desired box from this list. Thereby, for example, a box 1801 with the box number "01" can be selected as a box for storing a job for case binding. After completion of this selection, if a job for case binding is inputted, the job is stored in the box with the box number "01".

Next, a job for case binding will be described, with reference to FIGS. 19A and 19B.

Figure 19A:
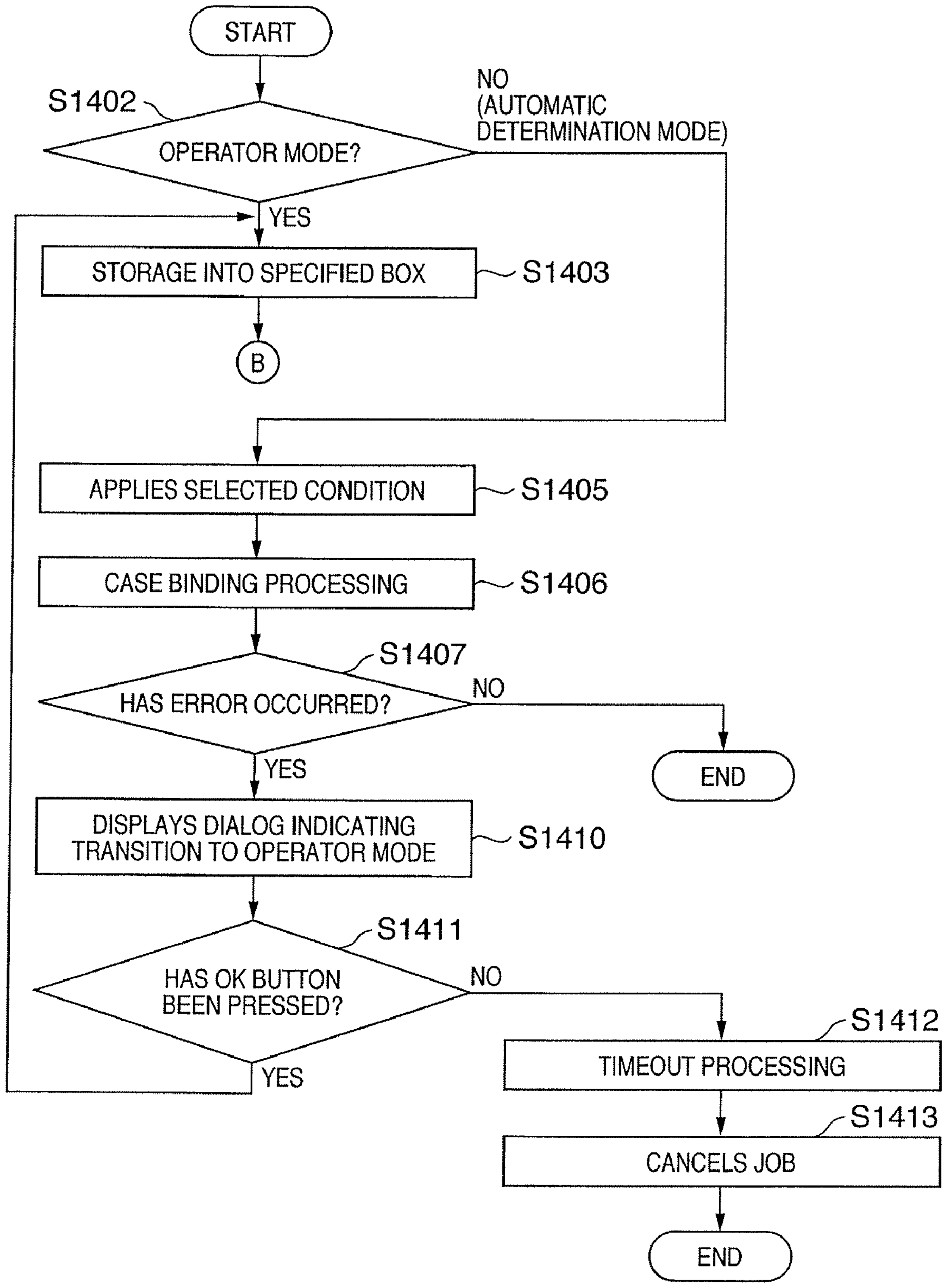
FIGS. 19A and 19B are flowcharts showing job processing of the embodiment 1 of the present invention.
Figure 19B:
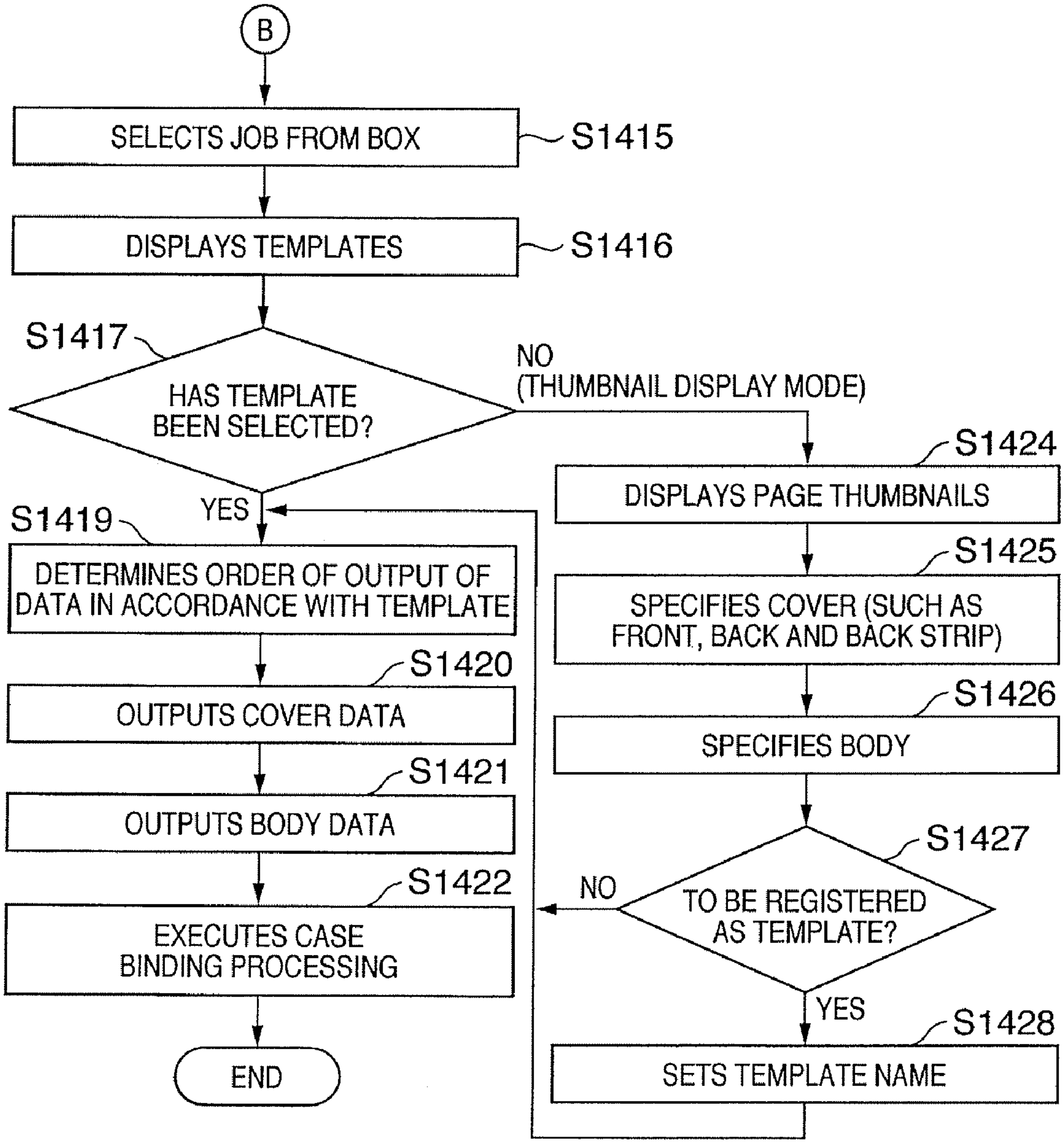

FIGS. 19A and 19B are flowcharts showing job processing of embodiment 1 of the present invention.

The processing in FIGS. 19A and 19B is realized by a dedicated program stored in the memory (RAM or ROM) of the job control unit 106 being executed under the control of the CPU of the job control unit 106. This processing is started by the job control unit 106 detecting that a job for case binding has been inputted as a job to be processed.

At step S1402, it is determined whether or not the case binding mode is the operator mode based on initial setting information stored in the resource management unit 112. If the mode is not the operator mode (step S1042: NO), that is, the mode is the automatic determination mode, then the conditions selected in the condition information stored in the resource management unit 112 is applied at step S1405.

At step S1406, the selected conditions are checked against the inputted job; data handling is performed; and case binding processing is executed by the printer unit 113 and the post-processing unit 114. The case binding processing here includes output of cover data and body data for case binding, and binding processing using these data. Next, at step S1407, it is determined whether or not an error has occurred in the case binding processing. If an error has not occurred (step S1407; NO), then the case binding processing is continued, and the processing ends.

Figure 20:
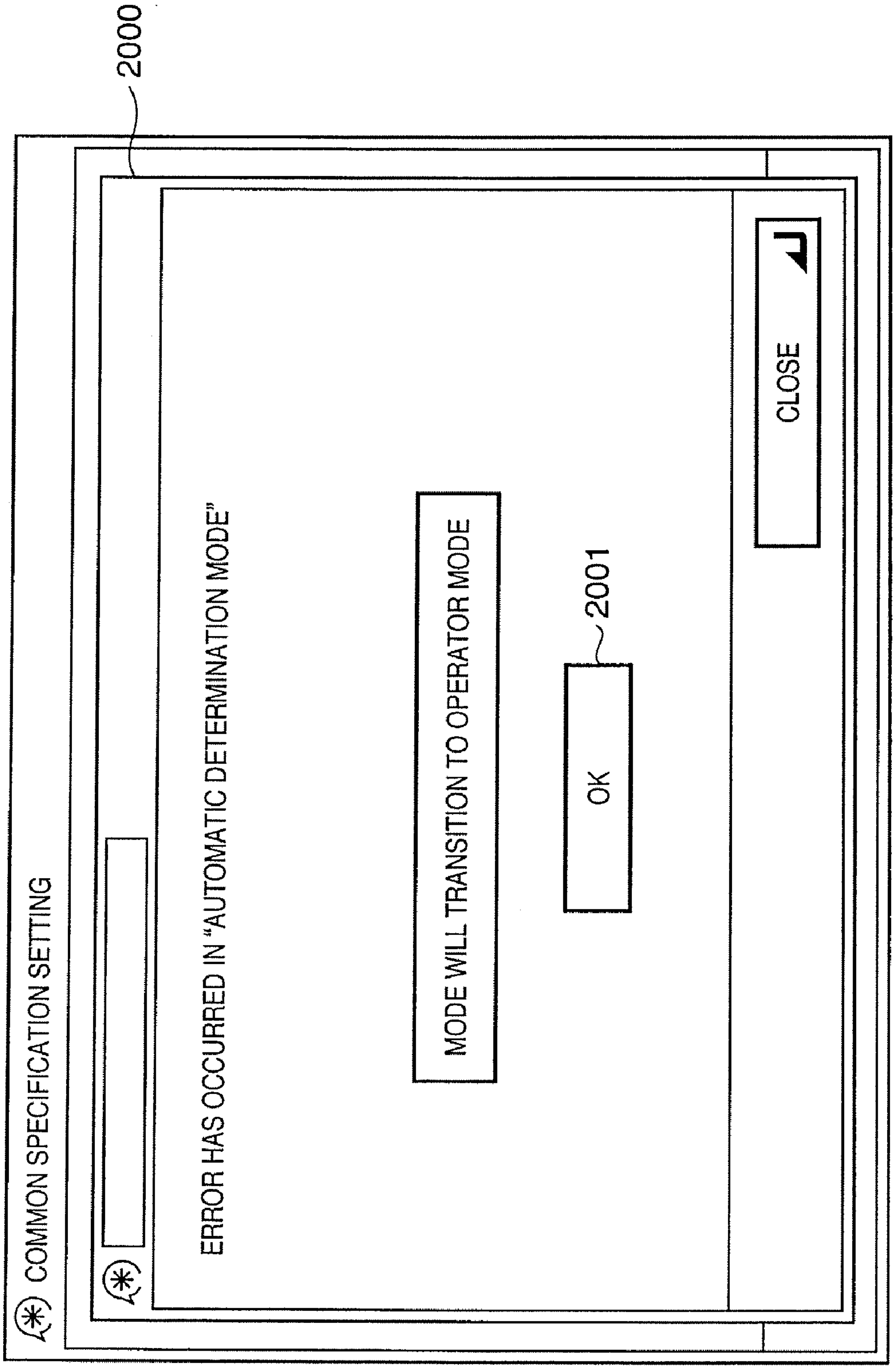
FIG. 20 is a diagram showing an example of a dialog of the embodiment 1 of the present invention.

On the other hand, if an error has occurred (step S1407; YES), then a dialog 2000 (FIG. 20) is displayed which indicates that the automatic determination mode will transition to the operator mode in which an operator performs an operation himself. At step S1411, it is determined whether or not an OK button 2001 in the dialog 2000 is pressed within a predetermined time period. If the OK button 2001 is pressed within the predetermined time period (step S1411: YES), then the processing proceeds to step S1403 to transition to the operator mode.

On the other hand, if the OK button 2001 is not pressed within the predetermined time period (step S1411: NO), then the processing proceeds to step S1412, and executes timeout processing by determining that transition to the operator mode is not intended. Then, at step S1413, the job to be processed is cancelled, and the processing ends.

The processing described above is the job processing performed in the case of using the automatic determination mode. Next, description will be made on job processing performed in the case of using the operator mode.

If the mode is the operator mode at step S1402 (step S1402: YES), then the processing proceeds to step S1403 and stores a job for case binding to be processed in a box selected on the box setting screen 1800 (FIG. 18). At step S1415 shown in FIG. 19B, jobs stored in the box are displayed, and a desired job is selected from among them. After the selection, at step S1416, the template management screen 1400 (FIG. 14) is displayed to display templates registered with the resource management unit 112.

On the template management screen 1400 shown in FIG. 14, templates of Type 1, Type 2 and Type 3 are displayed. The characteristics of each template are as follows.

In Type 1, "the first page is to be created with data of a cover; the second page is to be created with data of the backside of the cover; and the third and subsequent pages are to be created with data of a body".

In Type 2, "the last page is to be created with data of the backside of a cover; the page before the last page is to be created with data of the cover; and the first page to the third page from the last page are to be created with data of a body".

In Type 3, "the first page is to be created with data of the front side of a front cover; the second page is to be created with data of the backside of the front cover; the last page is to be created with back strip data; the second page from the last page is to be created with data of the front side of a back cover; and the third page from the last page is to be created with data of the backside of the back cover".

The example of FIG. 14 shows that Type 2 has been selected from among these. When the OK button 1401 is pressed in this state, the selection is determined.

Let's return to description of FIGS. 19A and 19B.

At step S1417, it is determined whether or not a template has been selected. If the OK button 1401 is pressed while a template is being selected, then it is determined that the template is selected. Meanwhile, if the close button 1405 is pressed while a template is not being selected, then it is determined that a template is not selected.

If a template is selected at step S1417 (step S1417: YES), then the processing proceeds to step S1419 and attributes for data constituting the job (page image data) based on the selected template are set. Then, the order of output of the data is determined based on the set attributes. Thus, the cover data for case binding and the body data for case binding are determined by the attributes set for the data constituting the job data.

Commonly, the cover data for case binding and the body data for case binding are outputted in that order. Therefore, the cover data for case binding is first outputted to the printer unit 113 at step S1420. Next, at step S1421, the body data for case binding is outputted to the printer unit 113. At step S1422, case binding processing is executed by the post-processing unit 114 for the outputted cover data and body data.

Figure 21:
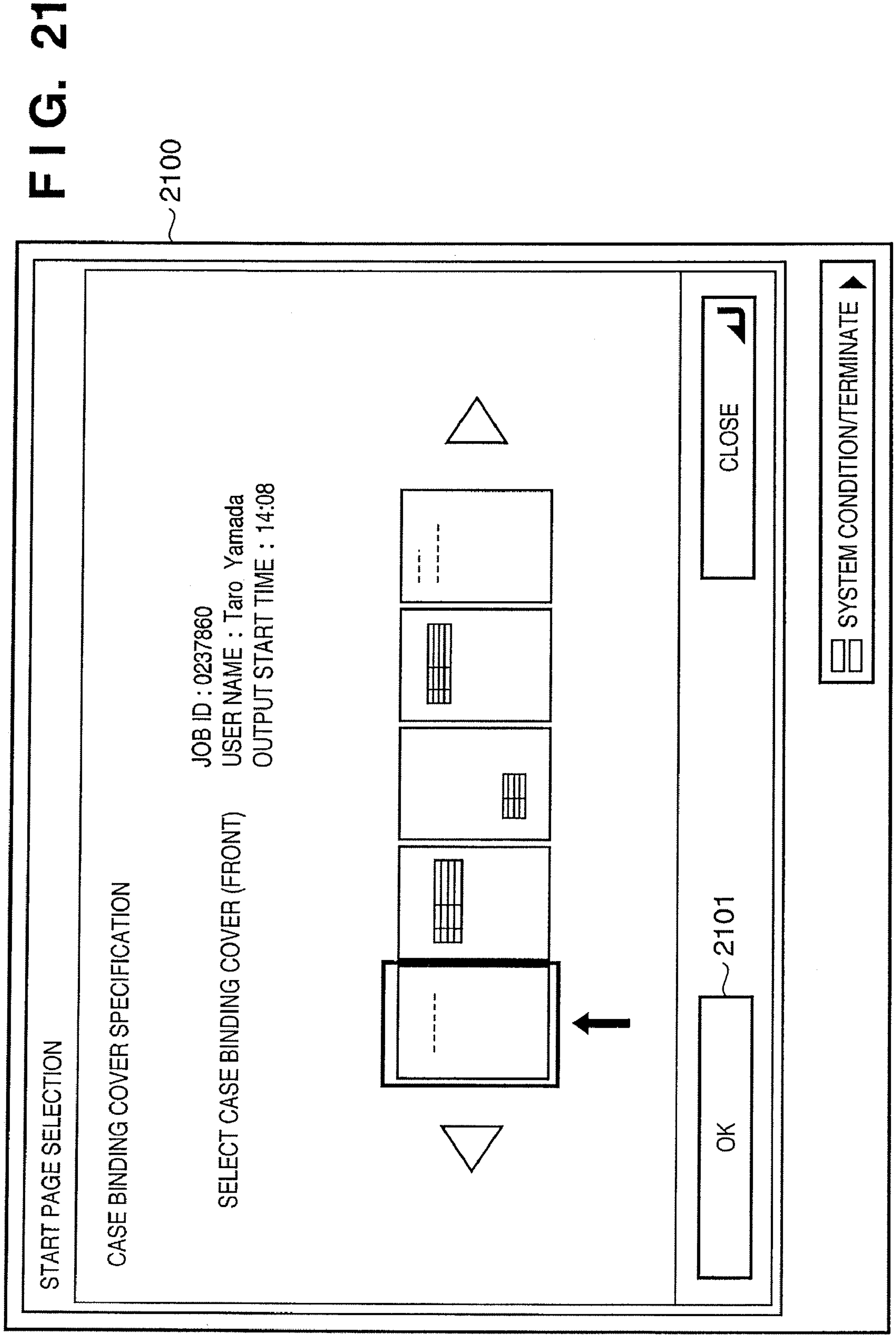
FIG. 21 is a diagram showing an example of a thumbnail display screen of the embodiment 1 of the present invention.

On the other hand, if a template is not selected (step S1417: NO), then the processing proceeds to step S1424 and displays thumbnail images of the page image data constituting the job. FIG. 21 shows an example thereof. FIG. 21 shows a thumbnail display screen 2100 for displaying thumbnails corresponding to page image data constituting a received job for case binding, which in the present example is a menu for selecting the "front side of case binding cover".

An operator can specify page attributes (cover, body and the like) in the case of binding processing, for the page image data displayed as thumbnails on the thumbnail display screen 2100. The thumbnail display screen 2100 is a screen for specifying page image data to which a "cover" is to be set as a page attribute.

By pressing an OK button 2101 while a desired thumbnail on the thumbnail display screen 2100 is being selected, the operator can set the "front side of case binding cover" as the page attribute of the page image data corresponding to the selected thumbnail. Similarly, various page attributes such as the backside of a case binding cover and selection of a body (a range is selectable) can be set. And, finally, all the attributes of the job for case binding are set by the system side (steps S1425 and S1426).

Figure 22:
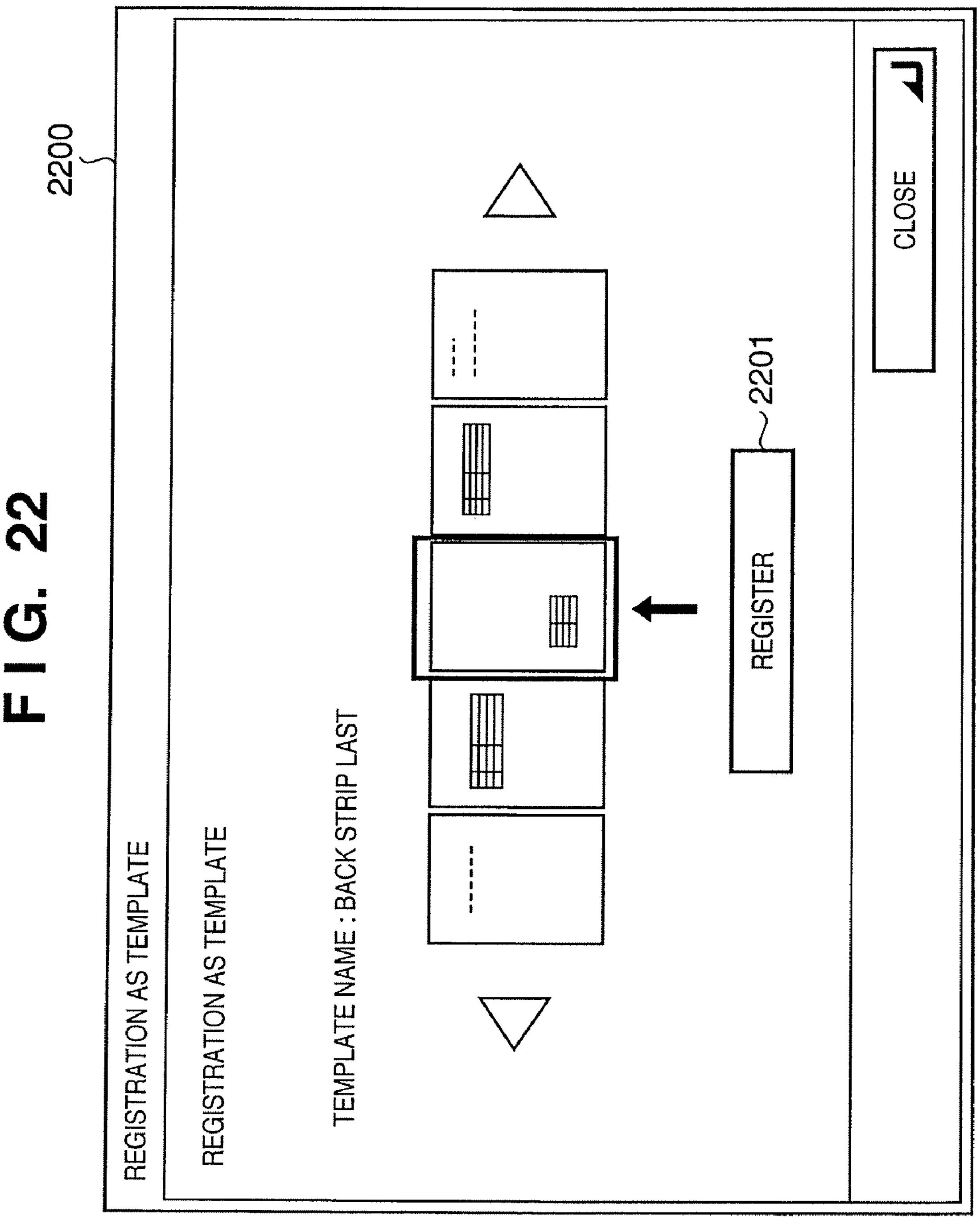
FIG. 22 is a diagram showing an example of a registration screen of the embodiment 1 of the present invention.

After completion of the series of settings, a registration screen 2200 (FIG. 22) for registering a sequence (pattern) of page image data having set attributes as a template is displayed. Thereby, the operator can register a sequence (pattern) of page image data having set attributes as a template. When a register button 2201 is pressed on this registration screen 2200, the sequence (pattern) of the page image data having set attributes is registered with the resource management unit 112 as a template. The registered template is to be displayed on the template management screen 1400 (FIG. 14) after that.

At step S1427, it is determined whether or not registration of a template has been instructed. If registration has been instructed (step S1427: YES), then the processing proceeds to step S1428 and sets a template name inputted via a setting screen for setting a template name. This template name and the template configured by a sequence (pattern) of page image data having set attributes are associated with each other and stored in the resource management unit 112. Then, the processing proceeds to step S1419. On the other hand, if registration has not been instructed (step S1427: No), then the processing proceeds to step S1419.

After that, processings at steps S1419 to S1422 are executed with the use of the template set via the thumbnail display screen 2100 (FIG. 21).

As described above, after attributes for page image data constituting a job for case binding are specified for the system, the order of output of the page image data constituting the job is determined in accordance with the specified attributes.

Figure 23A:
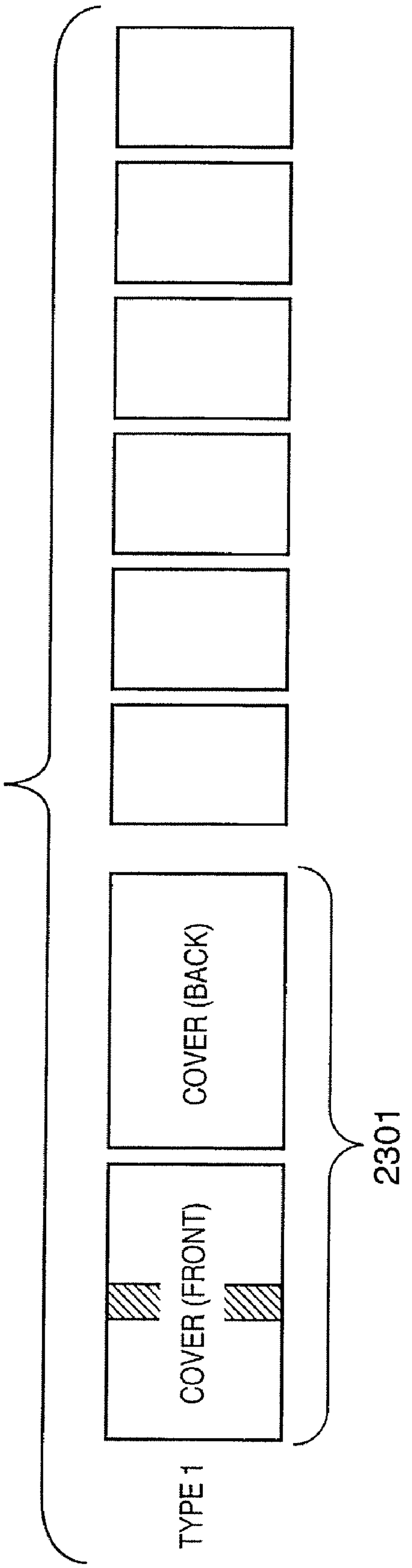
FIGS. 23A and 23B are diagrams showing an example of data output of the embodiment 1 of the present invention.

For example, when the Type 1 template shown in FIG. 23A is selected in the case where a case binding machine processes cover data prior to body data, page image data 2301 among the page image data constituting the job is outputted earlier as cover data. After that, the remaining data is outputted as body data. Thereby, data to be processed can be normally processed in accordance with the bookbinding order specified by the case binding machine.

Figure 23B:
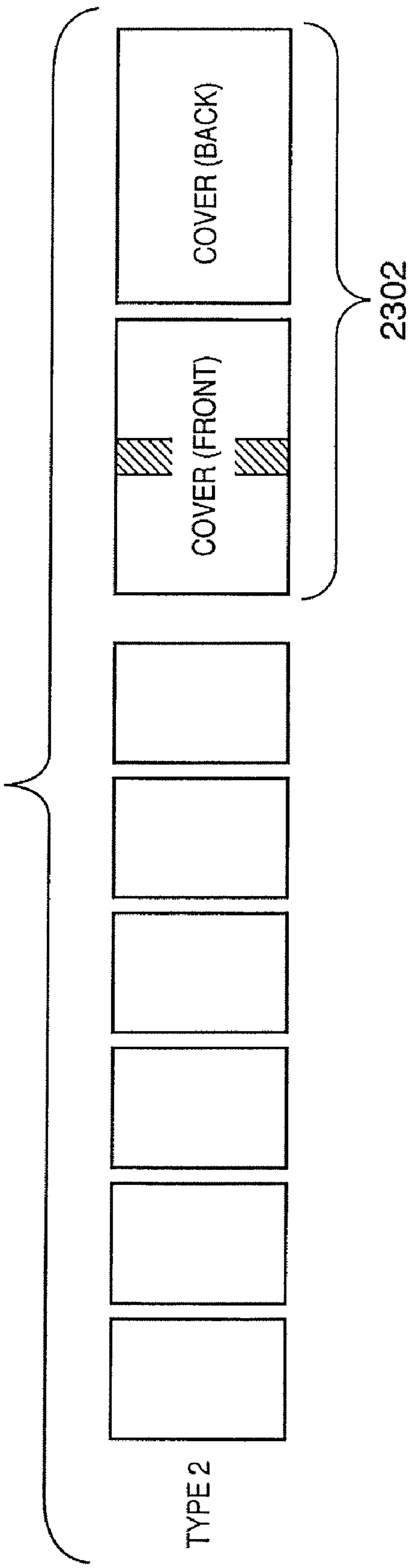

When the Type 2 template shown in FIG. 23B is selected, page image data 2302 among the page image data constituting the job is outputted earlier as cover data. After that, the remaining data is outputted as body data. Thereby, data to be processed can be normally processed in accordance with the bookbinding order specified by the case binding machine.

As described above, according to the embodiment 1, it is possible to specify attributes related to the order of page image data constituting a job for case binding or specify a condition for automatically determining such attributes. Thereby, even when the order of page image data constituting a job for case binding is different from a predetermined order required by case binding processing, it is possible to output the page image data in a manner that they are processed in the required, predetermined order in accordance with the specified attributes.

Thus, when creating a job for case binding, a user does not have to set the order of page image data by taking account of a predetermined order required by the output destination. That is, the user is not restricted when creating a job, and he can specify the type of a job constituted by page image data in any order, to the system, and thereby, increase in productivity as POD can be expected.

Embodiment 1 has been described with the use of an example where two kinds of modes (the automatic determination mode and the operator mode) are included in the case binding modes. However, the present invention is not limited thereto. According to applications or purposes, at least one of the automatic determination mode and the operator mode may be provided. When it is intended to further reduce troublesome operations by a user, it is desirable to provide only the automatic determination mode.

Embodiment 2

A configuration has been described in which processing is executed on an image processing apparatus in the embodiment 1. However, a configuration is also possible in which the processing described in the embodiment 1 is executed when a job is inputted, for example, into a hot folder on a server apparatus managed in the POD site environment.

Here, the hot folder has a function of monitoring whether or not data is stored in a predetermined data storage area (for example, a predetermined folder) managed by a server apparatus and, if storage of data is detected, executing processing assigned to the data in advance. Settings for this hot folder can be made on the server apparatus, for example, by a dedicated program.

Figure 24:
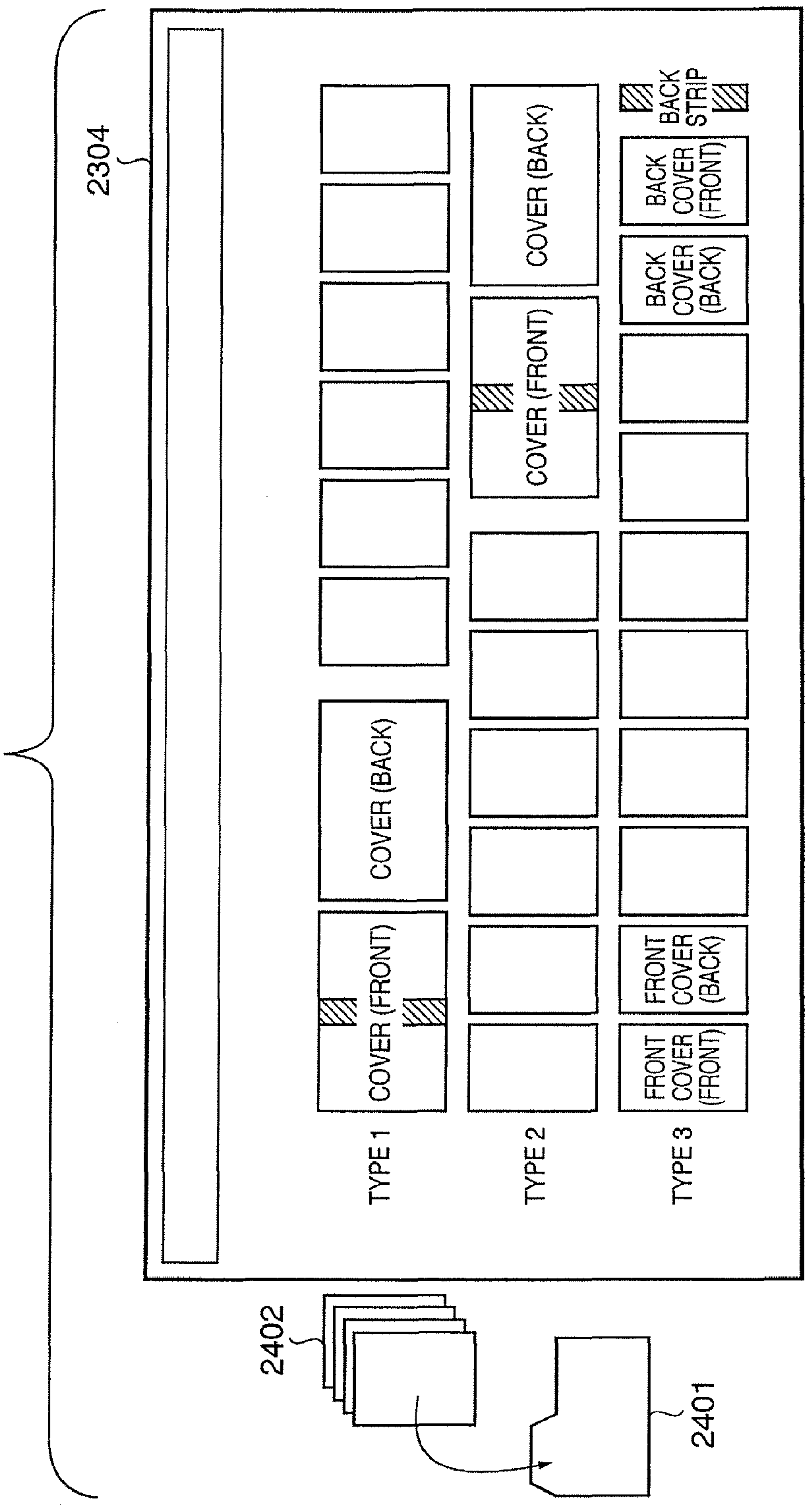
FIG. 24 is a diagram for illustrating the configuration of an embodiment 2 of the present invention.

In the embodiment 2, a hot folder 2401 for executing the processes shown in the flowcharts in FIGS. 7 and 19 is set on a server apparatus as shown in FIG. 24. When a job 2402 for case binding is inputted into this hot folder 2401, processing set for the hot folder 2401 is executed.

For example, if the operator mode is set for the hot folder 2401, templates registered in advance are displayed as shown as 2404. Then, an operator can select a desired template from the displayed templates and hand the attributes for case binding to the system side.

Note that the present invention can be applied to an apparatus comprising a single device or to a system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-295555, filed Oct. 7, 2005 which is hereby incorporated by reference herein in its entirety.

What is claimed is:

1. An image processing apparatus for processing a job for case binding, comprising:

input means for inputting a job including page data constituted by a bookbinding cover and body pages for the case binding;

storage means for storing the job inputted by the input means;

setting means for setting a bookbinding cover attribute for page data to be a cover in the job stored in the storage means;

decision means for deciding the order of output of page data in the job based on the attribute set by the setting means; and output means for reading the page data in the job stored in the storage means and outputting the page data to a printer unit in accordance with the order of output decided by the decision means, wherein the setting means comprises:

first setting means for inputting a determination condition for automatically setting a bookbinding cover attribute for page data in the job, and automatically setting a bookbinding cover attribute for particular page data in the job in accordance with the inputted determination condition;

second setting means for manually setting a bookbinding cover attribute for page data in the job in accordance with an operation by an operator; and selection means for selecting any of a first mode for executing the setting by the first setting means and a second mode for executing the setting by the second setting means.

2. An image processing apparatus according to claim 1, further comprising template storage means for storing templates configured by a pattern of a sequence of page data for which attributes are set in advance, wherein the first setting means is capable of selecting a desired template from among the templates stored in the template storage means as a condition for setting attributes for the page data in the job.

3. An image processing apparatus according to claim 1, wherein the first setting means comprises:

determination means for determining, when multiple kinds of conditions are inputted, whether or not the combination of the conditions is appropriate; and error message output means for outputting an error message based on the result of the determination by the determination means.

4. An image processing apparatus according to claim 1, further comprising message output means for, when an error occurs during output by the output means while the first mode is being selected, outputting a message to prompt transition to the second mode.

5. An image processing apparatus according to claim 1, wherein the second setting means comprises:

display means for displaying an image corresponding to page data in the job;

attribute setting means for setting attributes for the page data in the job with the use of the image displayed by the display means; and registration means for registering a pattern of a sequence of the page data for which the attributes have been set by the attribute setting means with the template storage means as a template.

6. An image processing apparatus according to claim 5, wherein the second setting means comprises import means for importing the template generated by an external application into the template storage means.

7. An image processing apparatus according to claim 1, wherein the attributes include at least one of "front side of case binding cover", "backside of case binding cover", "back strip of case binding cover" and "body other than case binding cover", and the attributes are set for the page data or page areas thereof.

8. An image processing apparatus according to claim 1, wherein the setting means sets the attributes for the page data in the job inputted by the input means based on operations performed on a setting screen displayed on a display unit provided for the image processing apparatus.

9. An image processing apparatus according to claim 1, wherein the storage means is a predetermined data storage area managed by an external apparatus connected to the image processing apparatus.

10. A method for controlling an image processing apparatus for processing a job including page data constituted by a bookbinding cover and body pages for the case binding, the method comprising:

an input step of inputting a job for case binding;

a storage step of storing the job inputted in the input step in storage means of the image processing apparatus;

a setting step of setting a bookbinding cover attribute, for page data to be a cover in the job stored in the storage means in the storage step;

a decision step of deciding the order of output of page data in the job based on the attribute set in the setting step; and an output step of reading the page data in the job stored in the storage means and outputting the page data to a printer unit in accordance with the order of output decided in the decision step, wherein the setting step comprises:

a first setting step of inputting a determination condition for automatically setting a bookbinding cover attribute for page data in the job, and automatically setting a bookbinding cover attribute for particular page data in the job in accordance with the inputted determination condition;

a second setting step of manually setting a bookbinding cover attribute for page data in the job in accordance with an operation by an operator; and a selection step of selecting any of a first mode for executing the setting in the first setting step and a second mode for executing the setting in the second setting step.

11. A method according to claim 10, further comprising template storage step of storing in the storage means, templates configured by a pattern of a sequence of page data for which attributes are set in advance, wherein the first setting step is capable of selecting a desired template from among the templates stored in the storage means as a condition for setting attributes for the page data in the job.

12. A method according to claim 10, wherein the first setting step comprises:

a determination step of determining, when multiple kinds of conditions are inputted, whether or not the combination of the conditions is appropriate; and an error message output step of outputting an error message based on the result of the determination in the determination step.

13. A method according to claim 10, further comprising message output step of, when an error occurs during output in the output step while the first mode being selected, outputting a message to prompt transition to the second mode.

14. A method according to claim 10, wherein the second setting step comprises:

a display step of displaying an image corresponding to page data in the job;

an attribute setting step of setting attributes for the page data in the job with the use of the image displayed in the display step; and a registration step of registering a pattern of a sequence of the page data for which the attributes have been set in the attribute setting step with the storage means as a template.

15. A method according to claim 14, wherein the second setting step comprises an import step of importing the template generated by an external application into the storage means.

16. A method according to claim 10, wherein the attributes include at least one of "front side of case binding cover", "backside of case binding cover", "back strip of case binding cover" and "body other than case binding cover", and the attributes are set for the page data or page areas thereof.

17. A method according to claim 10, wherein the setting step sets the attributes for the page data in the job inputted in the input step based on operations performed on a setting screen displayed on a display unit provided for the image processing apparatus.

18. A method according to claim 10, wherein the storage means is a predetermined data storage area managed by an external apparatus connected to the image processing apparatus.

19. A program stored in a computer-readable medium, for causing control of an image processing apparatus for processing a job including page data constituted by a bookbinding cover and body pages for the case binding to be executed, the program when loaded into a computer and executed causing the information processing apparatus to execute the following steps:

an input step of inputting a job for the case binding;

a storage step of storing the job inputted in the input step in storage means of the image processing apparatus;

a setting step of setting a bookbinding cover attribute for page data to be a cover in the job stored in the storage means in the storage step;

a decision step of deciding order of output of page data in the job based on the attribute set in the setting step; and an output step of reading the page data in the job stored in the storage means and outputting the page data to a printer unit in accordance with the order of output decided in the decision step, wherein the setting step comprises:

a first setting step of inputting a determination condition for automatically setting a bookbinding cover attribute for page data in the job, and automatically setting a bookbinding cover attribute for particular page data in the job in accordance with the inputted determination condition;

a second setting step of manually setting a bookbinding cover attribute for page data in the job in accordance with an operation by an operator; and a selection step of selecting any of a first mode for executing the setting in the first setting step and a second mode for executing the setting in the second setting step.

* * * * *